United States Patent
Kaneko et al.

(10) Patent No.: US 11,335,118 B2
(45) Date of Patent: May 17, 2022

(54) SIGNAL RETRIEVAL APPARATUS, METHOD, AND PROGRAM

(71) Applicant: NIPPON TELEGRAPH AND TELEPHONE CORPORATION, Tokyo (JP)

(72) Inventors: Takuhiro Kaneko, Atsugi (JP); Kaoru Hiramatsu, Atsugi (JP); Kunio Kashino, Atsugi (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 254 days.

(21) Appl. No.: 16/609,642

(22) PCT Filed: May 1, 2018

(86) PCT No.: PCT/JP2018/017430
§ 371 (c)(1),
(2) Date: Oct. 30, 2019

(87) PCT Pub. No.: WO2018/203555
PCT Pub. Date: Nov. 8, 2018

(65) Prior Publication Data
US 2020/0065560 A1  Feb. 27, 2020

(30) Foreign Application Priority Data

May 2, 2017 (JP) .............................. JP2017-091735

(51) Int. Cl.
*G06V 40/16* (2022.01)
*G06N 3/08* (2006.01)

(52) U.S. Cl.
CPC ............. *G06V 40/165* (2022.01); *G06N 3/08* (2013.01); *G06V 40/168* (2022.01); *G06V 40/171* (2022.01); *G06V 40/174* (2022.01)

(58) Field of Classification Search
CPC .... G06K 9/00221–00315; G06K 2009/00322; G06K 2009/0328; G06N 3/08; G06V 40/16–179
See application file for complete search history.

(56) References Cited

U.S. PATENT DOCUMENTS 10,824,942 B1 * 11/2020 Bhotika .................. G06F 16/51
2004/0170337 A1 * 9/2004 Simon ..................... G06T 11/00
382/254

(Continued)

FOREIGN PATENT DOCUMENTS

JP 2002183205 A * 6/2002
JP 2017054210 A   3/2017

OTHER PUBLICATIONS

Hiroshi Ishikawa, "Forest of Knowledge" Group 2-2 Chapter 2—The Institute of Electronics, Information and Communication Engineers, (2012).

(Continued)

*Primary Examiner* — Sean T Motsinger
(74) *Attorney, Agent, or Firm* — Harness, Dickey & Pierce, P.L.C.

(57) ABSTRACT

A signal output unit outputs an acquired signal. A signal accumulation unit accumulates signals. A signal attribute value display unit displays a value of an attribute related to an element constituting a target represented by the acquired signal or a signal generation source in a state in which an instruction for changing the value of the attribute is able to be received. A changed attribute value acquisition unit acquires a changed value of the attribute when the instruction for changing the value of the attribute is received. A signal retrieval unit retrieves, from the signals accumulated in the signal accumulation unit, a signal similar to a changed signal when the value of the attribute has been changed on (Continued)

the basis of the changed value of the attribute acquired by the changed attribute value acquisition unit.

11 Claims, 13 Drawing Sheets

(56) References Cited

U.S. PATENT DOCUMENTS

| | | |
|---|---|---|
| 2008/0052312 A1 | 2/2008 | Tang et al. |
| 2012/0299945 A1* | 11/2012 | Aarabi .................... G06T 11/60 345/589 |
| 2014/0153832 A1* | 6/2014 | Kwatra .................. G06T 11/00 382/195 |
| 2016/0284070 A1* | 9/2016 | Pettigrew ................ G06T 5/008 |
| 2017/0068845 A1 | 3/2017 | Saito et al. |
| 2018/0182145 A1* | 6/2018 | Imoto ...................... G06T 3/00 |
| 2018/0204111 A1* | 7/2018 | Zadeh .................. G06N 3/0436 |
| 2019/0130202 A1* | 5/2019 | Doumbouya ...... G06K 9/00369 |
| 2019/0197736 A1* | 6/2019 | Sugaya .............. G06Q 30/0643 |
| 2019/0294631 A1* | 9/2019 | Alcantara .............. G06N 3/084 |
| 2019/0325633 A1* | 10/2019 | Miller, IV ........... G06F 3/04847 |
| 2020/0065560 A1* | 2/2020 | Kaneko ............. G06K 9/00302 |
| 2020/0193661 A1* | 6/2020 | Kaneko ................ G06N 3/0472 |
| 2021/0201002 A1* | 7/2021 | Watanabe .......... G06K 9/00342 |

OTHER PUBLICATIONS

Yann LeCun et al., Deep learning, Nature, vol. 521, Issue. 28, 7553, pp. 436-444, (2015).

Kaneko, Takuhiro et al., "Generative Attribute Controller with Conditional Filtered Generative Adversarial Networks," 2017 IEEE Conference on Computer Vision and Pattern Recognition (CVPR 2017), (Jul. 21, 2017), pp. 7006-7015, <DOI:10.1109/CVPR. 2017. 741>.

International Search Report for PCT/JP2018/017430; dated Jul. 17, 2018; 3 pp.

Tachibana, R. et al., "Semi-Supervised Learning Using Adversarial Networks", 2016 IEEE/ACIS 15th International Conference on Computer and Information Science (ICIS), Japan, IEEE, Jun. 29, 2016, pp. 1-6, [online], [Aug. 28, 2013 search], <URL: https://ieeexplore.ieee.org/document/7550881>.

* cited by examiner

SIGNAL RETRIEVAL APPARATUS, METHOD, AND PROGRAM

CROSS-REFERENCE TO RELATED APPLICATIONS

This application is a 371 U.S. National Phase of International Application No. PCT/JP2018/017430, filed on May 1, 2018, which claims priority to Japanese Application No. 2017-091735, filed May 2, 2017. The entire disclosures of the above applications are incorporated herein by reference.

TECHNICAL FIELD

The present invention relates to a signal retrieval apparatus, method, and program for retrieving a signal.

BACKGROUND ART

Conventionally, feature quantities are extracted by performing feature quantity extraction on images and the images are collated on the basis of the extracted feature quantities (Non-Patent Document 1: see Group 2-Part 2-Chapter 2 "Overview" of image feature extraction and collation).

Moreover, a method for encoding an image using convolutional neural networks (CNNs) is known (Non-Patent Document 2).

PRIOR ART DOCUMENTS

Non-Patent Documents

Non-Patent Document 1: Ishikawa, "Forest of Knowledge", Group 2-Part 2-Chapter 2, the Institute of Electronics, Information and Communication Engineers, 2012.
Non-Patent Document 2: "Deep learning", Y. LeCun, Y. Bengio, and G. Hinton, Nature, 2015, www.nature.com.

SUMMARY OF INVENTION

Problems to be Solved by the Invention

In the method described in the Non-Patent Document 1, the accuracy of detection of the same image is high. However, when the same subject changes hairstyle or smiles, a feature quantity of an image in which an attribute of the subject has been changed is different from a feature quantity of an image before the attribute is changed. For this reason, the possibility that the image in which the attribute of the subject has been changed will be recognized to be similar to the collated image is reduced.

The present invention has been made in consideration of the above-described circumstances and an object of the present invention is to provide a signal retrieval apparatus, method, and program capable of retrieving a signal similar to a signal whose attribute has been changed.

Means for Solving the Problems

In order to achieve the above-described object, a signal retrieval apparatus according to a first aspect of the present invention includes: a signal output unit that outputs an acquired signal; a signal accumulation unit that accumulates signals; a signal attribute value display unit that displays a value of an attribute related to an element constituting a target represented by the acquired signal or a signal generation source in a state in which an instruction for changing the value of the attribute is able to be received; a changed attribute value acquisition unit that acquires a changed value of the attribute when the instruction for changing the value of the attribute is received; and a signal retrieval unit that retrieves, from the signals accumulated in the signal accumulation unit, a signal similar to a changed signal when the value of the attribute has been changed on the basis of the changed value of the attribute acquired by the changed attribute value acquisition unit.

A signal retrieval method according to a second aspect of the present invention includes: outputting, by a signal output unit, an acquired signal; displaying, by a signal attribute value display unit, a value of an attribute related to an element constituting a target represented by the acquired signal or a signal generation source in a state in which an instruction for changing the value of the attribute is able to be received; acquiring, by a changed attribute value acquisition unit, a changed value of the attribute when the instruction for changing the value of the attribute is received; and retrieving, by a signal retrieval unit, from a signal accumulation unit that accumulates signals, a signal similar to a changed signal when the value of the attribute has been changed on the basis of the changed value of the attribute acquired by the changed attribute value acquisition unit.

According to the first and second aspects, a value of an attribute related to an element constituting a target represented by an acquired signal or a signal generation source is displayed in a state in which an instruction for changing the value of the attribute is able to be received, and when the instruction for changing the value of the attribute is received, a signal similar to a changed signal when the value of the attribute has been changed is retrieved from the signal accumulation unit that accumulates signals on the basis of the changed value of the attribute. Thereby, it is possible to retrieve a signal similar to a signal whose attribute has been changed.

In the signal retrieval apparatus according to the first aspect, each of the acquired signal, the signals accumulated in the signal accumulation unit, the changed signal, and the signal similar to the changed signal may be an image, and the attribute may be an attribute related to an element constituting a subject represented by the image.

In the signal retrieval apparatus according to the first aspect, the signal attribute value display unit may display the value of the attribute by means of a controller indicating the value of the attribute as the state in which the instruction for changing the value of the attribute is able to be received.

A signal retrieval apparatus according to a third aspect of the present invention includes: a signal output unit that outputs an acquired signal; a signal accumulation unit that accumulates signals; a variable extraction unit that extracts, from the acquired signal, a value of an attribute related to an element constituting a target represented by the acquired signal or a signal generation source; a signal attribute value display unit that displays the value of the attribute in a state in which an instruction for changing the value of the attribute of the acquired signal is able to be received; a changed attribute value acquisition unit that acquires a changed value of the attribute when the instruction for changing the value of the attribute is received; and a signal retrieval unit that retrieves, from the signals accumulated in the signal accumulation unit, a signal similar to a changed signal when the value of the attribute has been changed on the basis of the changed value of the attribute, on the basis of the changed value of the attribute and a value of an attribute extracted with respect to each of the signals accumulated in the signal accumulation unit.

A signal retrieval method according to a fourth aspect of the present invention includes: outputting, by a signal output unit, an acquired signal; extracting, by a variable extraction unit, from the acquired signal, a value of an attribute related to an element constituting a target represented by the acquired signal or a signal generation source; displaying, by a signal attribute value display unit, the value of the attribute in a state in which an instruction for changing the value of the attribute of the acquired signal is able to be received; acquiring, by a changed attribute value acquisition unit, a changed value of the attribute when the instruction for changing the value of the attribute is received; and retrieving, by a signal retrieval unit, from signals accumulated in a signal accumulation unit, a signal similar to a changed signal when the value of the attribute has been changed on the basis of the changed value of the attribute, on the basis of the changed value of the attribute and a value of an attribute extracted with respect to each of the signals accumulated in the signal accumulation unit.

According to the third and fourth aspects, a value of an attribute of an acquired signal is extracted, the value of the attribute is displayed in a state in which an instruction for changing the value of the attribute is able to be received, and when the instruction for changing the value of the attribute is received, a signal similar to a changed signal when the value of the attribute has been changed is retrieved from the signal accumulation unit that accumulates signals on the basis of the changed value of the attribute. Thereby, it is possible to retrieve a signal similar to a signal whose attribute has been changed.

In the signal retrieval apparatus according to the third aspect, the signal retrieval unit may retrieve the signal similar to the changed signal from the signals accumulated in the signal accumulation unit by comparing the changed value of the attribute with the value of the attribute extracted with respect to each of the signals accumulated in the signal accumulation unit.

In the signal retrieval apparatus according to the third aspect, the variable extraction unit may extracts latent variables from the acquired signal using a pre-learned neural network, the latent variables including a latent variable representing the value of the attribute, the changed attribute value acquisition unit may acquire a latent variable representing the changed value of the attribute when the instruction for changing the value of the attribute is received, and the signal retrieval unit may retrieve, from the signals accumulated in the signal accumulation unit, a signal similar to a changed signal when the value of the attribute has been changed on the basis of the latent variable representing the changed value of the attribute by comparing the latent variable representing the changed value of the attribute with a latent variable representing the value of the attribute extracted with respect to each of the signals accumulated in the signal accumulation unit.

A program according to a fifth aspect of the present invention causes a computer to function as each unit constituting the signal retrieval apparatus.

Advantageous Effects of Invention

According to a signal retrieval apparatus, method, and program of the present invention, an advantageous effect that it is possible to retrieve a signal similar to a signal whose attribute has been changed can be obtained.

MODES FOR CARRYING OUT THE INVENTION

Hereinafter, embodiments of the present invention will be described in detail with reference to the drawings.

Overview of First Embodiment of Present Invention

First, an overview of the first embodiment of the present invention will be described.

Figure 1:
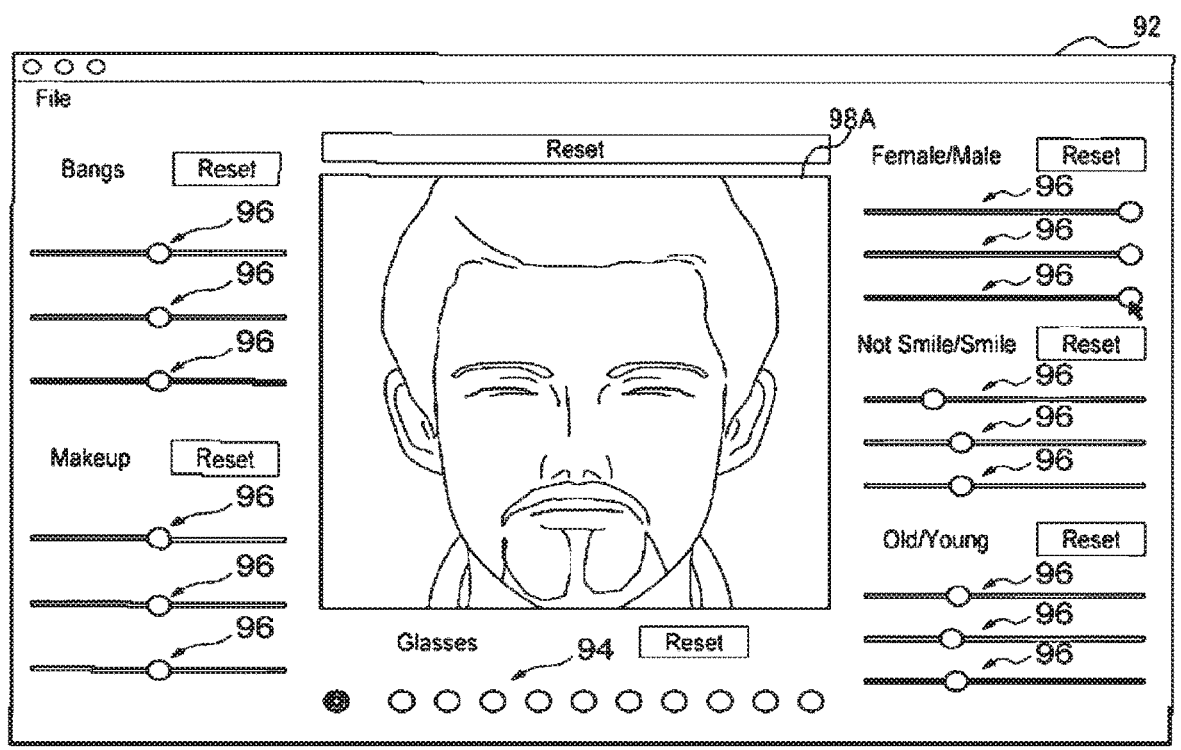
FIG. 1 is an imaginary diagram of an attribute change screen in a first embodiment of the present invention.

In the first embodiment, as shown in FIG. 1, it is possible to freely control an attribute by moving a slide bar 96 corresponding to the value of the attribute or clicking a radio button 94 and retrieve an image having a similar attribute as in conventional image editing software.

Here, various data exists in society. For example, there are images corresponding to various face orientations, images corresponding to various illumination conditions, images corresponding to various ages, and images corresponding to various facial expressions.

Figure 2:
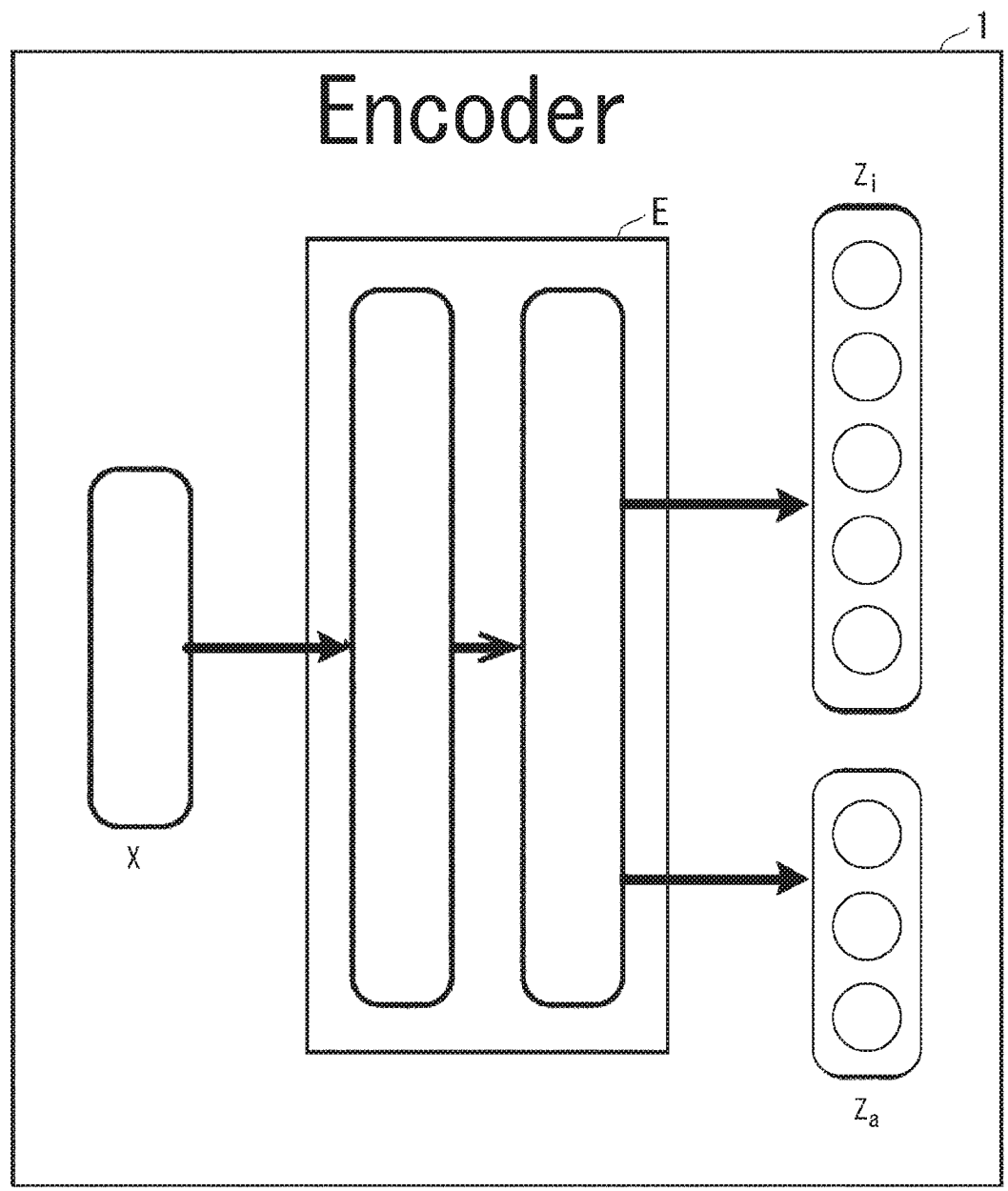
FIG. 2 is a conceptual diagram of an encoder in the first embodiment of the present invention.

Therefore, in the present embodiment, latent variables (like an essence useful for representing an image) are extracted using a neural network E as shown in FIG. 2, and the value of a latent variable is changed, and an image similar to an image after the change is retrieved, rather than directly retrieving an image.

Moreover, diversity is present even in one attribute. For example, even "bangs" have a variety of shapes.

Figure 3:
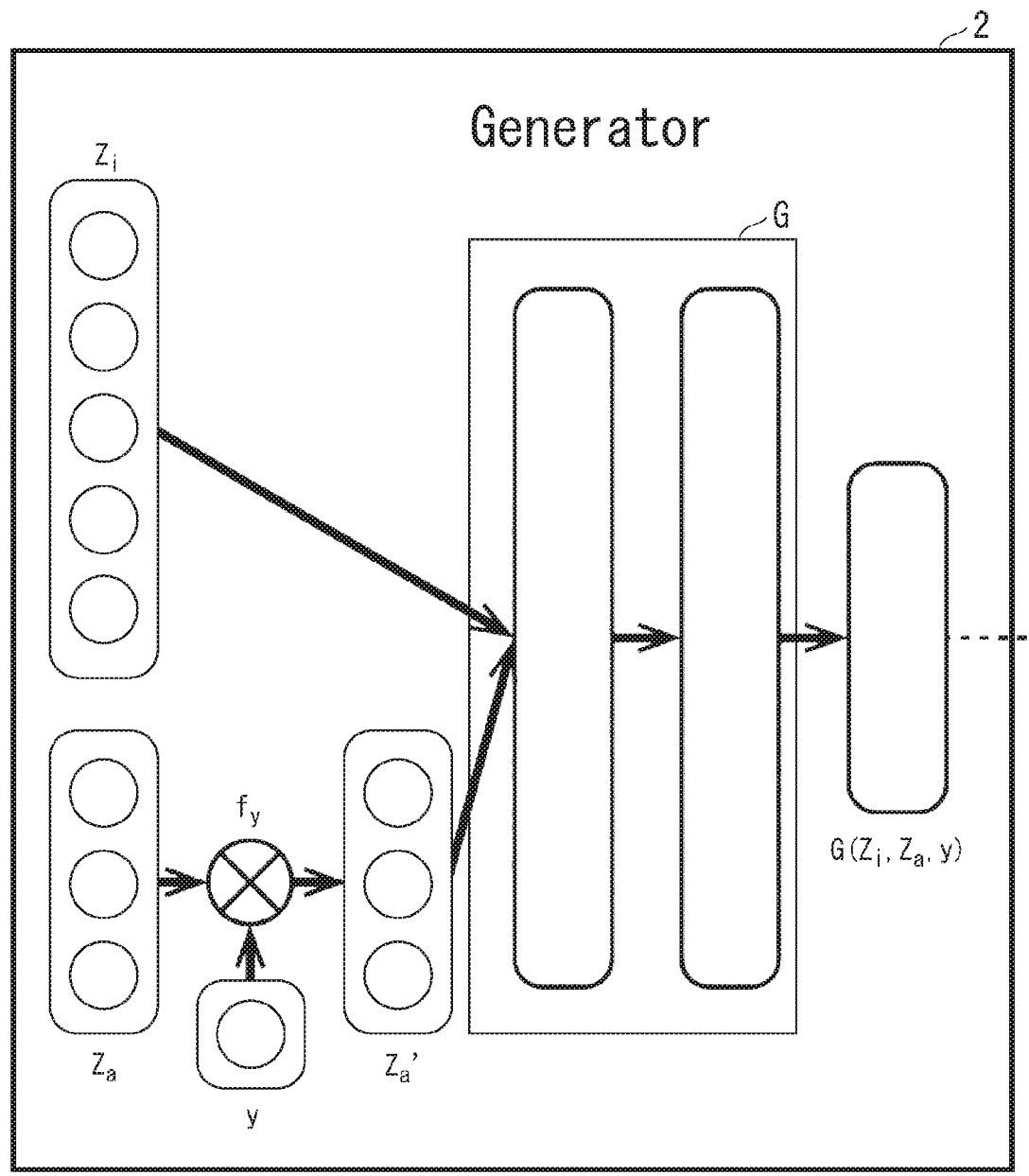
FIG. 3 is a conceptual diagram of a generator in the first embodiment of the present invention.

Therefore, in the present embodiment, for each of attributes, each attribute is represented by a plurality of latent variables, as shown in FIG. 3. Specifically, an attribute can be controlled easily by separating the plurality of latent variables into latent variables representing identity and latent variables representing the attribute. Sufficient expressiveness can be obtained by representing each attribute using a plurality of latent variables on an attribute-by-attribute basis. When an attribute is represented by a discrete value, a latent variable may be represented by continuous values which can be any values in a section defined by discrete values that can be taken by the attribute. A generator 2 obtains sufficient expressiveness by representing each attribute with a latent variable having continuous values. Likewise, when an attribute is represented by a given distribution, a latent variable may be represented by a more detailed distribution than the given distribution. The generator 2 obtains sufficient expressiveness by representing each attribute using a latent variable that follows the more detailed distribution. It is to be noted that among a plurality of latent variables, a latent variable (a latent variable $z_a$ in FIG. 3) that is constrained by an attribute vector y to be described below is a latent variable representing an attribute. Moreover, among a plurality of latent variables, a latent variable (a latent variable $z_i$ in FIG. 3) that is not constrained by the attribute vector y is a latent variable representing identity.

Moreover, if generative adversarial networks (GANs) are used when the structure of a generator is learned, identity and attributes cannot be explicitly separated because the input of the generator is only a random number z. Furthermore, if conditional generative adversarial networks (CGANs) are used when the structure of a generator is learned, the inputs of the generator are the random number z and the attribute vector y, and thus identity and attributes can be separated by learning the generator and a discriminator conditioned by the attribute vector y. However, because the attribute vector y is restrictive (it represents the presence or absence of an attribute, positive or negative of an attribute, or the like), attribute information capable of being separated from identity is restrictive. It is to be noted that positive or negative of an attribute is, for example, "male/female" as described below.

Figure 4:
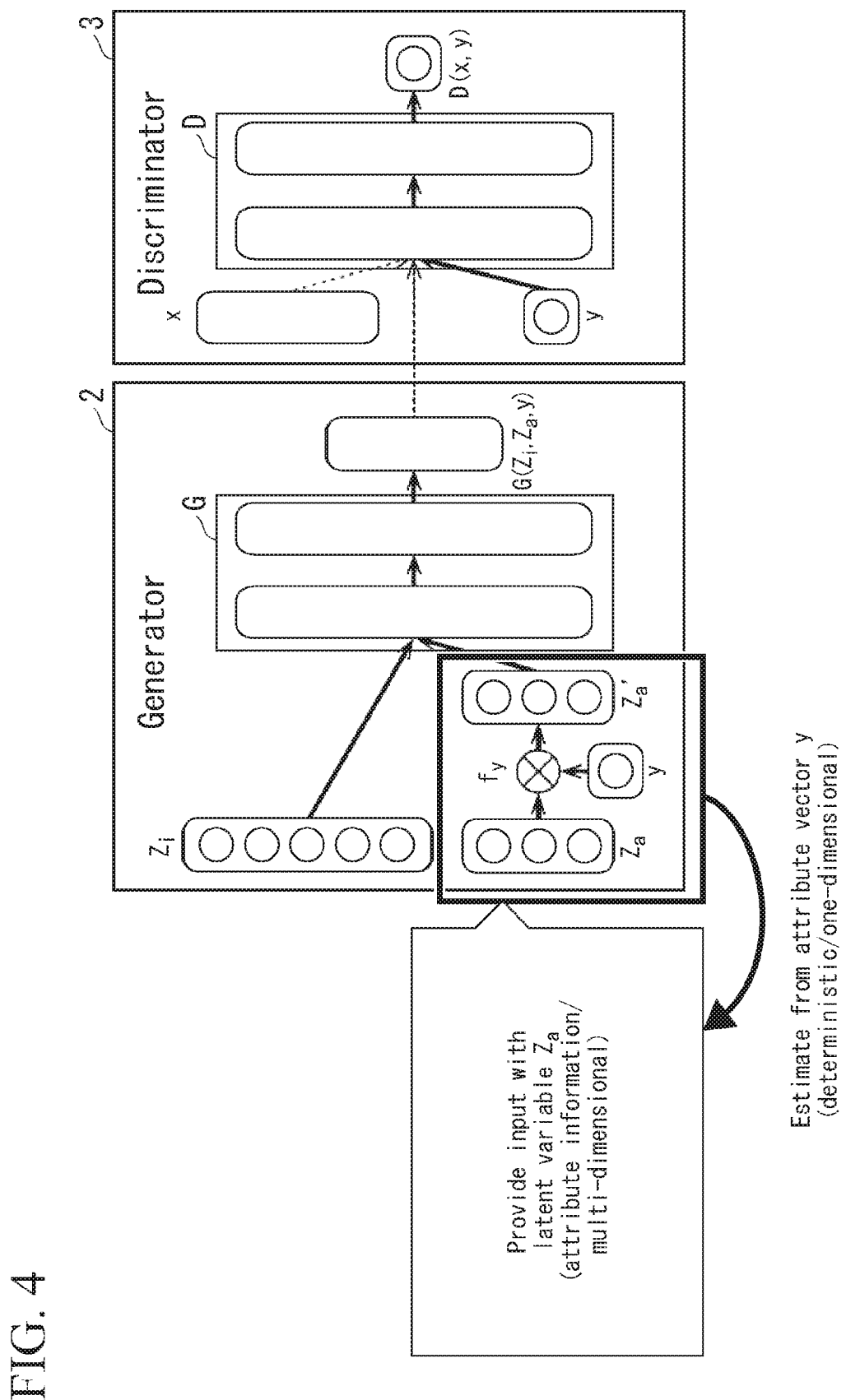
FIG. 4 is a diagram explaining a method for learning a generator and a discriminator.

Therefore, in the present embodiment, conditional filtered generative adversarial networks (CFGANs) are learned together at the time of learning of the generator 2, as shown in FIG. 4. At this time, in the CFGAN, the inputs of the generator 2 are a latent variable $z_i$ generated from a given data distribution and a latent variable $z_a'$ that is a multi-dimensional representation of attributes, and thus it is possible to separate identity and detailed attribute information by learning a neural network G serving as the generator 2 and a neural network D serving as a discriminator 3 conditioned by the attribute vector y.

Moreover, in the present embodiment, when an attribute of an image is to be changed, the attribute is changed while the identity is maintained.

<Configuration of Signal Retrieval Apparatus According to First Embodiment of Present Invention>

Figure 5:
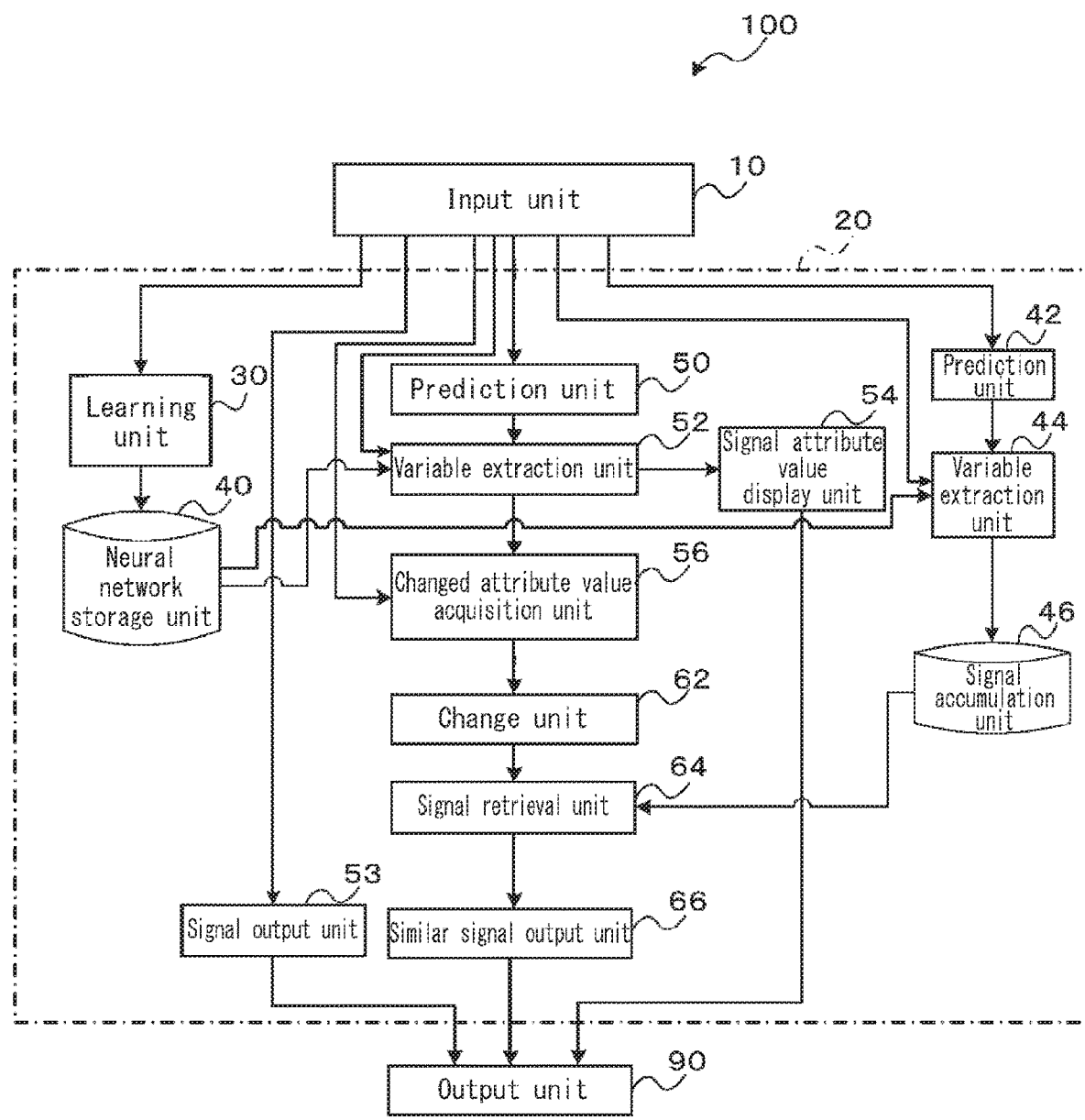
FIG. 5 is a block diagram showing a configuration of a signal retrieval apparatus according to first and second embodiments of the present invention.

Next, a configuration of a signal retrieval apparatus according to the first embodiment of the present invention will be described. As shown in FIG. 5, the signal retrieval apparatus 100 according to the first embodiment of the present invention can be configured by a computer including a central processing unit (CPU), a random access memory (RAM), and a read only memory (ROM) that stores programs for executing a learning process routine and a retrieval process routine to be described below and various types of data. As shown in FIG. 5, the signal retrieval apparatus 100 functionally includes an input unit 10, an arithmetic unit 20, and an output unit 90.

The input unit 10 receives a plurality of pairs of image data x and an attribute vector y as learning data. Moreover, the input unit 10 receives a plurality of pieces of accumulated image data that are retrieval targets and image data x that is a change target for retrieval. An attribute vector y represents, for example, the presence or absence of an attribute or positive or negative of an attribute. However, the attribute vector y is not particularly limited thereto.

The arithmetic unit 20 includes a learning unit 30, a neural network storage unit 40, a prediction unit 42, a variable extraction unit 44, a signal accumulation unit 46, a prediction unit 50, a variable extraction unit 52, a signal output unit 53, a signal attribute value display unit 54, a changed attribute value acquisition unit 56, a change unit 62, a signal retrieval unit 64, and a similar signal output unit 66.

The learning unit 30 learns these neural networks so that the neural network G serving as the generator 2 and the neural network D serving as the discriminator 3 follow optimization conditions that contend with each other on the basis of the input learning data. The neural network G serving as the generator 2 receives a generated latent variable $z_i$ representing identity and a generated latent variable $z_a'$ representing each attribute and generates image data from the latent variable $z_i$ representing identity and the latent variable $z_a'$ representing each attribute. The neural network D serving as the discriminator 3 discriminates whether or not the generated image data follows the same distribution as true image data x under the attribute vector y representing each attribute of the image data. That is, the neural network D serving as the discriminator 3 discriminates whether or not the generated image data is the true image data x. The latent variable $z_a'$ representing each attribute that becomes an input to the neural network G serving as the generator 2 is obtained by converting the latent variable $z_a$ representing each attribute using the value of the attribute vector y. As an example of conversion, it is conceivable that the generated latent variable $z_a$ representing each attribute is multiplied by the attribute vector y as shown in the following formula when the attribute vector y represents the presence or absence of an attribute (i.e., y=1 when an attribute is present and y=0 when the attribute is absent).

[Expression 1]

$$z_a' = \begin{cases} z_a & (y=1) \\ 0 & (y=0) \end{cases} \quad (1)$$

Alternatively, it is conceivable that a positive value ($|z_a|$) (when y=1) or a negative value ($-|z_a|$) (when y=0) is assigned to the generated latent variable $z_a$ representing each attribute in accordance with the attribute vector y as shown in the following formula when the attribute vector y represents positive or negative of an attribute.

[Expression 2]

$$z_a' = \begin{cases} |z_a| & (y=1) \\ -|z_a| & (y=0) \end{cases} \quad (2)$$

Specifically, the learning unit 30 receives image data x and the attribute vector y of the input learning data and the latent variable $z_i$ representing identity and the latent variable $z_a$ representing each attribute generated from a given data distribution. The latent variable $z_i$ and the latent variable $z_a$ may be generated using random numbers. Here, when the image data x is face image data, the attribute vector y represents the presence or absence of each of "glasses", "makeup", "beard", and "bangs" and the distinction between "male/female", "not smile/smile", and "old/young", and the latent variable $z_a$ representing an attribute represents the diversity within each attribute (e.g., representing "What type of glasses are they?").

Moreover, when the latent variable $z_a$ representing an attribute is generated from a given data distribution, the learning unit 30 generates the latent variable $z_a$ representing the attribute in accordance with the following formula, if, for example, the latent variable $z_a$ representing the attribute is discrete.

[Expression 3]

$$z_a \sim \text{Cat}\left(K = k, p = \frac{1}{k}\right) \quad (3)$$

where k represents the number of categories (the number of discrete values). Moreover, Cat represents a distribution having values indicating categories equal in number to the number of categories K, and p represents a probability.

Moreover, when the latent variable $z_a$ representing the attribute is continuous, the learning unit 30 generates the latent variable $z_a$ representing the attribute in accordance with the following formula.

[Expression 4]

$$z_a \sim \text{Unif}(-1,1) \quad (4)$$

where Unif(−1, 1) is a uniform distribution in which the range of values is from −1 to 1.

It is to be noted that a latent variable $z_a$ that follows another distribution and conversion can be adopted. For example, it is possible to use a normal distribution instead of the uniform distribution (Unif (−1, 1)) as the distribution of the latent variable $z_a$ and it is also possible to change the range of values.

Moreover, the learning unit 30 receives the generated latent variable $z_i$ representing identity and the generated latent variable $z_a'$ representing each attribute and generates image data using the neural network G serving as the generator 2. At this time, the latent variable $z_a'$ representing each attribute that is an input of the neural network G serving as the generator 2 is obtained by converting the latent variable $z_a$ representing each attribute using the value of the attribute vector y. As an example of the conversion, it is conceivable that the generated latent variable $z_a$ representing each attribute is multiplied by the attribute vector y.

Then, the learning unit 30 updates a parameter of the neural network G serving as the generator 2 so as to satisfy a constraint that the discriminator 3 discriminates that the generated image data follows the same distribution as the true image data under the attribute vector y as much as possible. That is, the parameter of the neural network G serving as the generator 2 is updated so that the discriminator 3 discriminates the generated image as the true image data.

Moreover, the learning unit 30 updates a parameter of the neural network D serving as the discriminator 3 so as to satisfy a constraint that the discriminator 3 discriminates that the generated image data does not follow the same distribution as the true image data under the attribute vector y as much as possible and so as to satisfy a constraint that the discriminator 3 discriminates that the true image data x follows the same distribution as the true image data.

It is to be noted that the optimization conditions that the neural network G serving as the generator 2 and the neural network D serving as the discriminator 3 contend with each other are represented by the following formula.

[Expression 5]

$$\min_G \max_D \mathbb{E}_{x,y \sim P_{data}(x,y)}[\log D(x, y)] + \quad (5)$$
$$\mathbb{E}_{z_i \sim P_{z_i}(z_i), z_a \sim P_{z_a}(z_a), y \sim P_y(y)}[\log(1 - D(G(z_i, z_a, y), y))]$$

where $$x, y \sim P_{data}(x, y) \quad [\text{Expression 6}]$$

represents that the true image data x and the attribute vector y are sampled from the learning data.

Moreover, $$z_i \sim P_{z_i}(z_i) \quad [\text{Expression 7}]$$

represents that a latent variable $z_i$ representing identity is generated from a given data distribution.

Moreover, $$z_a \sim P_{z_a}(z_a) \quad [\text{Expression 8}]$$

represents that a latent variable $z_a$ representing an attribute is generated from a given data distribution.

Moreover, $$y \sim P_y(y) \quad [\text{Expression 9}]$$

represents that the attribute vector y is sampled from the learning data.

Moreover, E represents an expected value.

The learning unit 30 performs the above-described process for each piece of the learning data and iteratively updates the parameter of the neural network G serving as the generator 2 and the parameter of the neural network D serving as the discriminator 3.

The neural network G serving as the generator 2 and the neural network D serving as the discriminator 3 which are finally obtained are stored in the neural network storage unit 40.

Next, as shown in FIG. 2, the learning unit 30 receives image data x included in the input learning data and extracts a latent variable $z_i$ representing identity and a latent variable $z_a$ representing each attribute using the neural network E serving as the encoder 1.

Moreover, as shown in FIG. 3, the learning unit 30 receives the extracted latent variable $z_i$ representing identity and the latent variable $z_a'$ representing each attribute and generates image data $G(z_i, z_a, y)$ using the neural network G serving as the generator 2. At this time, the latent variable $z_a'$ representing each attribute is obtained by converting the latent variable $z_a$ representing each attribute output by the neural network E serving as the encoder 1 using the value of the attribute vector y. It is to be noted that in FIG. 3, $f_y$ is a filter function used for conversion. As an example of the conversion, it is conceivable that the latent variable $z_a$ representing each attribute output by the neural network E serving as the encoder 1 is multiplied by the attribute vector y.

Moreover, the learning unit 30 updates the parameter of the neural network E serving as the encoder 1 so as to satisfy a constraint that the generated image data is the same as the original image data x.

The learning unit 30 performs the above-described process for each piece of the learning data and iteratively updates the parameter of the neural network E serving as the encoder 1.

The neural network E serving as the encoder 1 which is finally obtained is stored in the neural network storage unit 40.

The prediction unit 42 inputs the accumulated image data received by the input unit 10 to a pre-learned neural network (e.g., convolutional neural networks (CNNs)) serving as a predictor (not shown) for predicting the attribute vector y and predicts the attribute vector y.

The neural network serving as the predictor outputs the attribute vector y. The attribute vector y is, for example, a classification of the presence or absence of each attribute or positive or negative of each attribute. However, the attribute vector y is not particularly limited thereto.

The variable extraction unit 44 receives the accumulated image data and extracts a latent variables $z_i$ representing identity of the accumulated image data and a latent variable $z_a$ representing each attribute of the accumulated image data using the neural network E serving as the encoder 1 stored in the neural network storage unit 40. Moreover, the variable extraction unit 44 obtains a latent variable $z_a'$ representing each attribute on the basis of the extracted latent variable $z_a$ representing each attribute and the attribute vector y predicted by the prediction unit 42. At this time, the latent variable $z_a'$ representing each attribute is obtained by converting the latent variable $z_a$ representing each attribute extracted by the variable extraction unit 44 using the value of the attribute vector y predicted by the prediction unit 42. As an example of conversion, it is conceivable that the latent variable $z_a$ representing each attribute is multiplied by the attribute vector y. Because each attribute is represented by a plurality of latent variables $z_a$ for each of the attributes, the elements of the attribute vector y are multiplied by all of the plurality of latent variables corresponding to each attribute.

The signal accumulation unit 46 stores each piece of the accumulated image data together with the latent variable $z_a'$ representing each attribute of the accumulated image data obtained by the variable extraction unit 44.

The prediction unit 50 inputs the image data x of the change target received by the input unit 10 to a pre-learned neural network serving as a predictor (not shown) for predicting the attribute vector y and predicts the attribute vector y.

The variable extraction unit 52 receives the input image data x of the change target and extracts a latent variable $z_i$ representing identity of the image data x of the change target and a latent variable $z_a$ representing each attribute of the image data x of the change target using the neural network E serving as the encoder 1 stored in the neural network storage unit 40. Moreover, the variable extraction unit 52 obtains a latent variable $z_a'$ representing each attribute on the basis of the extracted latent variable $z_a$ representing each attribute and the attribute vector y predicted by the prediction unit 50. At this time, the latent variable $z_a'$ representing each attribute is obtained by converting the latent variable $z_a$ representing each attribute extracted by the variable extraction unit 52 using the value of the attribute vector y predicted by the prediction unit 50.

The signal output unit 53 causes the output unit 90 to display the input image data x of the change target in an image display region 98A of an attribute change screen 92, as shown in FIG. 1.

The signal attribute value display unit 54 causes the output unit 90 to display a latent variable $z_a'$ representing each attribute of the image data x of the change target in a state in which an instruction for changing the value can be received. Specifically, as shown in FIG. 1, the value of the latent variable $z_a'$ is displayed in the attribute change screen 92 by means of any controller such as a radio button 94 or a slide bar 96 indicating the value of the latent variable $z_a'$ representing each attribute in a state in which the instruction for changing the value of the latent variable $z_a'$ representing each attribute can be received.

The changed attribute value acquisition unit 56 acquires a changed value of the latent variable $z_a'$ representing the attribute of the change target when the instruction for changing the value of the latent variable $z_a'$ representing the attribute of the change target (e.g., an operation on a radio button 94 or a slide bar 96 indicating the value of the latent variable $z_a'$ representing the attribute) is received in the attribute change screen 92.

When an operation on a radio button 94 has been received, the changed attribute value acquisition unit 56 acquires the changed value of the latent variable $z_a'$ representing the attribute of the change target determined in advance for the operated radio button 94.

Moreover, when an operation on a slide bar 96 corresponding to a latent variable related to the presence or absence of an attribute such as an attribute "bangs" or an attribute "makeup" has been received, the changed attribute value acquisition unit 56 acquires the changed value of the latent variable $z_a'$ representing the attribute of the change target determined in advance for the position of the slide bar 96 that has been operated.

Moreover, when an operation on a slide bar 96 corresponding to a latent variable related to positive or negative of an attribute such as an attribute "male/female" or an attribute "not smile/smile" has been received, the changed attribute value acquisition unit 56 acquires the changed value of the latent variable $z_a'$ representing the attribute of the change target determined in advance for the position of the slide bar 96 that has been operated.

The change unit 62 changes the value of the latent variable $z_a'$ representing the attribute of the change target by replacing the value of the latent variable $z_a'$ representing the attribute of the change target acquired by the changed attribute value acquisition unit 56 among latent variables $z_a'$ representing each attribute obtained by the variable extraction unit 52 with the changed value.

The signal retrieval unit 64 retrieves accumulated image data corresponding to a latent variable most similar to the latent variable $z_a'$ representing each attribute after the change by the change unit 62 by comparing the latent variable $z_a'$ representing each attribute after the change by the change unit 62 with the latent variable $z_a'$ representing each attribute of each piece of accumulated image data stored in the signal accumulation unit 46. It is to be noted that it is only necessary to use a known distance measure such as an L2 distance or a Euclidean distance as a distance measure when the comparison is performed. Moreover, retrieval results may be sorted in order of the degree of similarity and may be output in the form of ranking.

The similar signal output unit 66 causes the output unit 90 to display the accumulated image data retrieved by the signal retrieval unit 64 in the image display region 98A of the attribute change screen 92, as shown in FIG. 1.

<Operation of Signal Retrieval Apparatus According to First Embodiment of Present Invention>

Next, an operation of the signal retrieval apparatus 100 according to the first embodiment of the present invention will be described. The signal retrieval apparatus 100 executes a learning process routine and a retrieval process routine to be described below.

Figure 6:
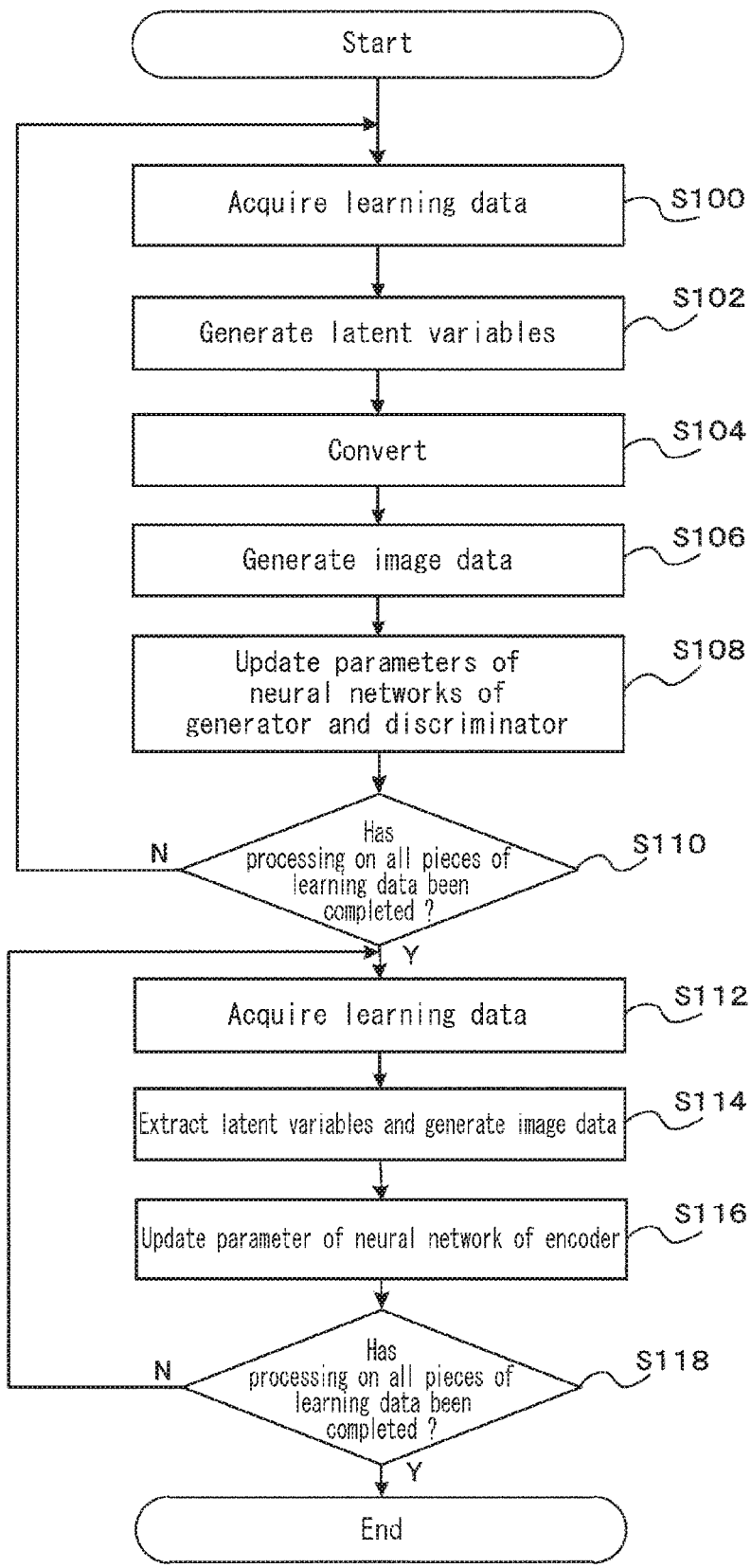
FIG. 6 is a flowchart showing a learning process routine in the signal retrieval apparatus according to the first and second embodiments of the present invention.

First, the learning process routine will be described. When the input unit 10 receives a plurality of pairs of image data x and an attribute vector y as learning data, the signal retrieval apparatus 100 executes the learning process routine shown in FIG. 6.

First, in step S100, the learning unit 30 acquires any one of a plurality of pieces of learning data received by the input unit 10.

Next, in step S102, the learning unit 30 generates a latent variable $z_i$ representing identity and a latent variable $z_a$ representing each attribute from a given data distribution. The learning unit 30 may generate the latent variable $z_i$ and the latent variable $z_a$ using random numbers.

In step S104, the learning unit 30 obtains a latent variable $z_a'$ representing each attribute by converting the latent variable $z_a$ representing each attribute generated in step S102 using the value of the attribute vector y acquired in step S100.

Then, in step S106, the learning unit 30 receives the latent variable $z_i$ representing identity and the latent variable $z_a'$ representing each attribute obtained by the conversion, which have been obtained in the steps S102 and S104, respectively, and generates image data $x^p$ using the neural network G serving as the generator 2.

In step S108, the learning unit 30 updates a parameter of the neural network G serving as the generator 2 and a parameter of the neural network D serving as the discriminator 3 on the basis of the latent variable $z_i$ representing identity generated in the step S102, the latent variable $z_a'$ representing each attribute, the image data $x^p$ generated in the step S106, and the image data x and the attribute vector y included in the learning data obtained in step S100.

In step S110, the learning unit 30 determines whether or not the processing of the steps S100 to S108 has been executed on all the pieces of the learning data. When there is learning data on which the processing of the steps S100 to S108 has not been executed, the learning unit 30 returns the processing to the step S100 and acquires the learning data. In contrast, when the processing of the steps S100 to S108 has been executed on all the pieces of the learning data, the learning unit 30 stores the parameter of the neural network G serving as the generator 2 and the parameter of the neural network D serving as the discriminator 3 that have been finally obtained in the neural network storage unit 40.

Next, in step S112, the learning unit 30 acquires any one of the plurality of pieces of learning data received by the input unit 10.

In step S114, the learning unit 30 receives image data x and an attribute vector y included in the learning data obtained in step S112 and extracts the latent variable $z_i$ representing identity and the latent variable $z_a$ representing each attribute using the neural network E serving as the encoder 1. Moreover, the learning unit 30 receives the extracted latent variable $z_i$ representing identity and the extracted latent variable $z_a'$ representing each attribute and generates image data using the neural network G serving as the generator 2. At this time, the latent variable $z_a'$ representing each attribute is obtained by converting the extracted latent variable $z_a$ representing each attribute using the value of the attribute vector y of the image data.

In step S116, the learning unit 30 updates a parameter of the neural network E serving as the encoder 1 on the basis of the generated image data and the image data x included in the learning data obtained in step S112.

In step S118, the learning unit 30 determines whether or not the processing of the steps S112 to S116 has been executed on all the pieces of the learning data. When there is learning data on which the processing of the steps S112 to S116 has not been executed, the learning unit 30 returns the processing to the step S112 and acquires the learning data. In contrast, when the processing of the steps S112 to S116 has been executed on all the pieces of the learning data, the learning unit 30 completes the learning process routine and stores the finally obtained parameter of the neural network E serving as the encoder 1 in the neural network storage unit 40.

Then, when the input unit 10 receives a plurality of pieces of accumulated image data, the prediction unit 42 inputs each piece of the accumulated image data received by the input unit 10 to a pre-learned neural network serving as a predictor for predicting the attribute vector y and predicts the attribute vector y.

Moreover, the variable extraction unit 44 receives each piece of the accumulated image data and extracts a latent variable $z_i$ representing identity of the accumulated image data and a latent variable $z_a$ representing each attribute using the neural network E serving as the encoder 1 stored in the neural network storage unit 40. Moreover, the variable extraction unit 44 obtains a latent variable $z_a'$ representing each attribute on the basis of the extracted latent variable $z_a$ representing each attribute and the attribute vector y predicted by the prediction unit 42.

Then, each piece of the accumulated image data is stored in the signal accumulation unit 46 together with the latent variable $z_a'$ representing each attribute of the accumulated image data obtained by the variable extraction unit 44.

Figure 7:
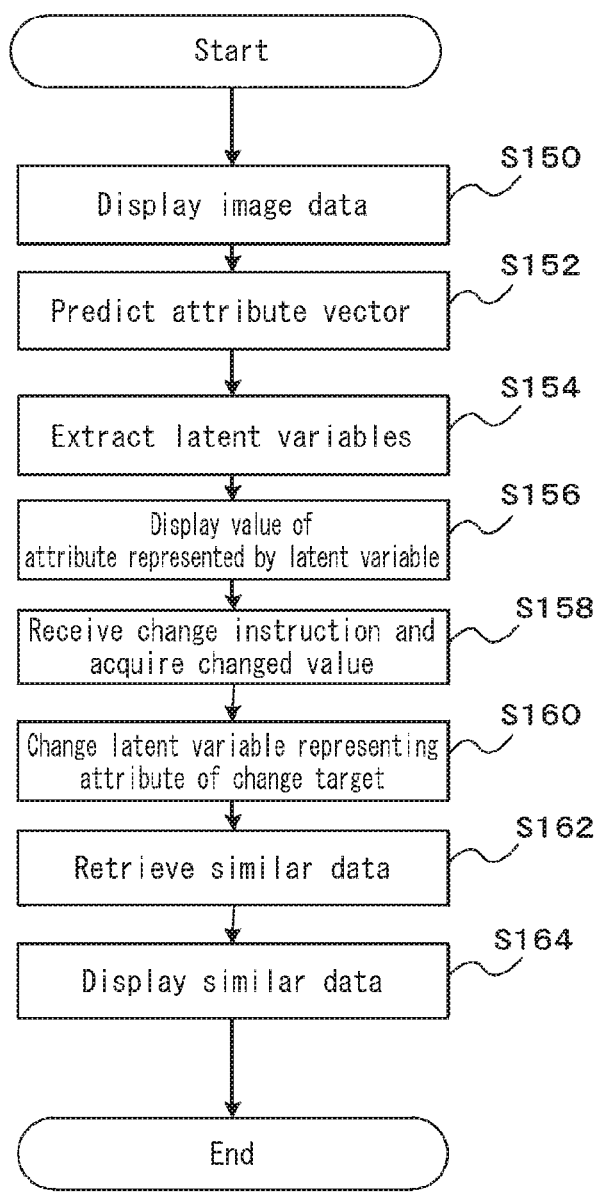
FIG. 7 is a flowchart showing a retrieval process routine in the signal retrieval apparatus according to the first and second embodiments of the present invention.

Next, the retrieval process routine will be described. When the input unit 10 receives image data of a change target for the retrieval, the signal retrieval apparatus 100 executes the retrieval process routine shown in FIG. 7.

In step S150, the signal output unit 53 causes the output unit 90 to display the input image data of the change target in the image display region 98A of the attribute change screen 92, as shown in FIG. 1.

In step S152, the prediction unit 50 predicts the attribute vector y using the pre-learned neural network serving as the predictor on the basis of the image data of the change target received by the input unit 10.

In step S154, the variable extraction unit 52 receives the image data of the change target received by the input unit 10 and extracts a latent variable $z_i$ representing identity and a latent variable $z_a$ representing each attribute using the neural network E serving as the encoder 1 stored in the neural network storage unit 40. Moreover, the variable extraction unit 52 obtains a latent variable $z_a'$ representing each attribute on the basis of the extracted latent variable $z_a$ representing each attribute and the attribute vector y predicted in step S152. At this time, the latent variable $z_a'$ representing each attribute is obtained by converting the extracted latent variable $z_a$ representing each attribute using the value of the predicted attribute vector y.

In step S156, the signal attribute value display unit 54 causes the output unit 90 to display the latent variable $z_a'$ representing each attribute of the image data x of the change target obtained in the step S154 in a state in which an instruction for changing the value can be received. Specifically, as shown in FIG. 1, the signal attribute value display unit 54 displays the value of the latent variable $z_a'$ in the attribute change screen 92 by means of a radio button 94 or a slide bar 96 indicating the value of the latent variable $z_a'$ representing each attribute in a state in which the instruction for changing the value of the latent variable $z_a'$ representing each attribute can be received.

In step S158, the changed attribute value acquisition unit 56 acquires a changed value of the latent variable $z_a'$ representing the attribute of the change target when the instruction for changing the value of the latent variable $z_a'$ representing the attribute of the change target (e.g., an operation on the radio button 94 or the slide bar 96 indicating the value of the latent variable $z_a'$ representing the attribute) is received in the attribute change screen 92.

In step S160, the change unit 62 changes the value of the latent variable $z_a'$ representing the attribute of the change target by replacing the value of the latent variable $z_a'$ representing the attribute of the change target acquired in the step S158 among latent variables $z_a'$ representing each attribute obtained in the step S154 with the changed value.

Then, in step S162, the signal retrieval unit 64 retrieves accumulated image data corresponding to a latent variable most similar to the latent variable $z_a'$ representing each attribute after the change by the change unit 62 by comparing the latent variable $z_a'$ representing each attribute after the change in the step S160 with the latent variable $z_a'$ representing each attribute of each piece of the accumulated image data stored in the signal accumulation unit 46.

Then, in step S164, the similar signal output unit 66 causes the output unit 90 to display the accumulated image data retrieved in the step S162 in the image display region 98A of the attribute change screen 92, as shown in FIG. 1 and completes the retrieval process routine.

As described above, the signal retrieval apparatus according to the first embodiment of the present invention displays the value of a latent variable representing an attribute in a state in which an instruction for changing the value of a latent variable representing each attribute extracted with respect to image data of a change target can be received, and when the instruction for changing the value of the latent variable representing the attribute is received, retrieves accumulated image data similar to image data when the attribute is changed on the basis of the changed value of the latent variable representing the attribute. Thereby, it is possible to retrieve accumulated image data similar to image data whose attribute has been changed.

Moreover, the signal retrieval apparatus according to the first embodiment of the present invention extracts a latent variable representing each attribute of the input image data using the neural network E serving as the encoder 1, displays the value of the latent variable representing the attribute in a state in which an instruction for changing the value of the extracted latent variable representing each attribute can be received, changes the value of the latent variable representing the attribute of the change target when the instruction for changing the value of the latent variable representing the attribute is received, and retrieves accumulated image data similar to image data after the change. Thereby, it is possible to retrieve accumulated image data similar to image data whose attribute has been changed.

Moreover, the signal retrieval apparatus according to the first embodiment of the present invention can represent the diversity of an attribute because there are a plurality of latent variables for each attribute. Furthermore, the signal retrieval apparatus according to the first embodiment of the present invention can control only the value of one of the plurality of latent variables for one attribute. For example, when only an attribute (e.g., glasses) is changed, it is only necessary to interactively change each dimension of a multi-dimensional latent variable $z_a$ while fixing the latent variable $z_i$ representing identity. When only identity is changed while the attributes are maintained, it is only necessary to change the latent variable $z_i$ representing identity while fixing the latent variables $z_a$ representing each attribute.

It is to be noted that the above-described embodiment describes an example in which the neural network G serving as the generator 2 and the neural network D serving as the discriminator 3 are learned in accordance with optimization conditions that contend with each other. However, the constraint is not limited thereto. For example, a constraint may be further provided so that each latent variable represents an independent one. Specifically, as shown in the following formula, a constraint is further provided so that a correlation (information amount) between the latent variable $z_a'$ and image data generated from the latent variable $z_a'$ becomes large.

[Expression 10]

$$\begin{aligned}
I(z_a'; G(z_i, z_a, y)|y) \qquad (6)\\
= H(z_a'|y) - H(z_a'|G(z_i, z_a, y), y)\\
= H(z_a'|y) + \mathbb{E}_{x \sim G(z_i, z_a, y)}[\mathbb{E}_{z_a' \sim P(z_a'|x, y)}[\log P(z_a'|x, y)]]\\
= H(z_a'|y) + \mathbb{E}_{x \sim G(z_i, z_a, y)}\\
\qquad [D_{KL}(P(*|x, y)\|Q(*|x, y) + \mathbb{E}_{z_a' \sim P(z_a'|x, y)}[\log Q(z_a'|x, y)]]\\
\geq H(z_a'|y) + \mathbb{E}_{x \sim G(z_i, z_a, y)}[\mathbb{E}_{z_a' \sim P(z_a'|x, y)}[\log Q(z_a'|x, y)]]\\
= H(z_a'|y) + \mathbb{E}_{z_a' \sim P(z_a'|y), x \sim G(z_i, z_a')}[\log Q(z_a'|x, y)].
\end{aligned}$$

It is to be noted that $I(z_a'; G(z_i, z_a, y)|y)$ represents the amount of mutual information between the latent variable $z_a'$ and the image data $G(z_i, z_a, y)$ when the attribute vector y is given. H represents conditional entropy. $D_{KL}$ represents Kullback-Leibler divergence. $P(z_a'|x, y)$ represents a distribution of latent variables $z_a'$ when the image data x and the attribute vector y are given. $z_a'^{\wedge}$ ($\wedge$ is attached above $z_a$) is a latent variable obtained in accordance with the distribution $P(z_a'|x, y)$.

Because $P(z_a'|x, y)$ is unknown, it is difficult to directly obtain the amount of information I. Thus, as described above, an approximation distribution $Q(z_a'|x, y)$ for approximating $P(z_a'|x, y)$ is introduced and a neural network for estimating the approximation distribution $Q(z_a'|x, y)$ is learned and optimization conditions that contend with each other are optimized so that a lower limit of the amount of information I is maximized using calculus of variations. Thereby, when a plurality of latent variables for the attribute "glasses" include a latent variable $z_a^1$ and a latent variable $z_a^2$ and the latent variable $z_a^1$ related to the attribute "glasses" represents sunglasses, the latent variable $z_a^2$ represents glasses other than sunglasses.

Moreover, the first embodiment describes an example in which the neural network E serving as the encoder 1 simultaneously estimates the latent variable $z_a$ representing the attribute and the latent variable $z_i$ representing identity. However, a method for estimating the latent variables is not limited thereto. For example, the neural network E serving as the encoder 1 may simultaneously estimate the latent variable $z_a'$ representing the attribute and the latent variable $z_i$ representing identity by directly estimating the latent variable $z_a'$ representing the attribute instead of the latent variable $z_a$ representing the attribute.

Moreover, if the neural network for estimating the approximation distribution $Q(z_a'|x, y)$ is learned together when the neural network G serving as the generator 2 is learned, the latent variable $z_a'$ representing the attribute may be estimated using the neural network for estimating the approximation distribution and the neural network E serving as the encoder 1 may estimate only the latent variable $z_i$ representing identity.

Moreover, the optimum latent variable $z_i$ representing identity may be obtained by inputting any latent variable $z_i$ representing identity to the neural network G serving as the generator 2 without using the neural network E serving as the encoder 1 and updating the latent variable $z_i$ representing identity using a gradient method so that the output of the neural network G serving as the generator 2 is close to the target image x. Moreover, the optimum latent variable $z_i$ representing identity may be obtained by obtaining a latent variable $z_a'$ representing an attribute and a latent variable $z_i$ representing identity using the neural network E serving as the encoder 1, setting the latent variable $z_a'$ and the latent variable $z_i$ as initial values, inputting the latent variable $z_i$ representing identity to the neural network G serving as the generator 2, and updating the latent variable $z_i$ representing identity using a gradient method so that the output of the neural network G serving as the generator 2 is close to the target image x. Moreover, the neural network E serving as the encoder 1 or the neural network serving as the predictor may be learned together with the neural network G serving as the generator 2 and the neural network D serving as the discriminator 3.

Next, a signal retrieval apparatus according to a second embodiment of the present invention will be described. It is to be noted that because components of the signal retrieval apparatus according to the second embodiment are similar to those of the signal retrieval apparatus according to the first embodiment, the components are denoted by the same reference signs and a description thereof will be omitted.

The second embodiment is different from the first embodiment in that latent variables representing each attribute are hierarchically structured.

Overview of Second Embodiment of Present Invention

Next, an overview of the second embodiment of the present invention will be described.

Figure 8:
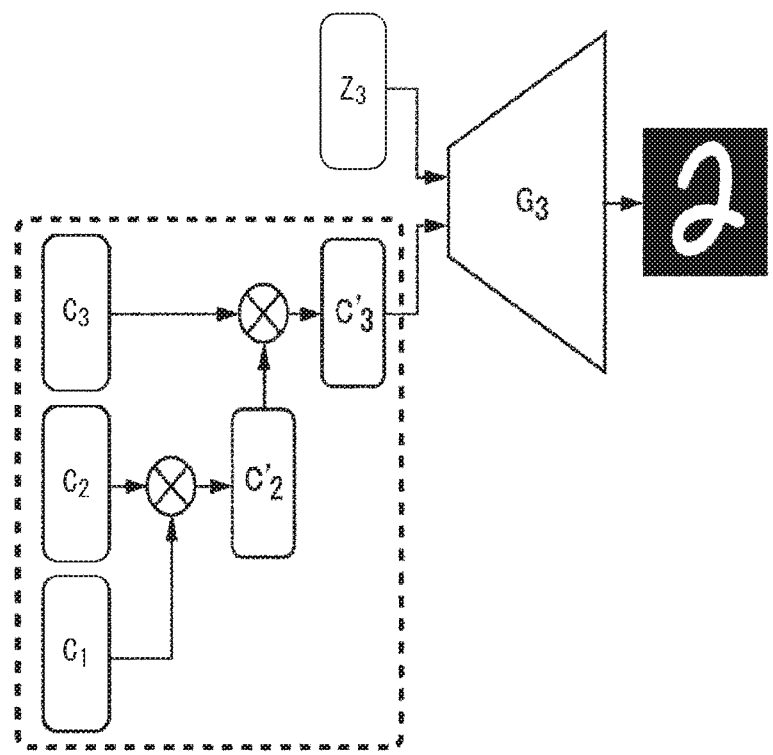
FIG. 8 is a conceptual diagram of a generator in the second embodiment of the present invention.

In order to achieve hierarchical control of attributes, the second embodiment has a structure in which a latent variable representing each attribute is hierarchically converted into latent variables of two or more layers as shown in FIG. 8. Moreover, a latent variable $c_1$ of a first layer represents each attribute and corresponds to the attribute vector y in the first embodiment. The latent variable represents, for example, the presence or absence of an attribute or positive or negative of an attribute. However, latent variables are not particularly limited thereto.

A latent variable $c_2$ of a second layer is converted using the value of the latent variable $c_1$ of the first layer and a conversion result $c_2'$ is obtained. Moreover, a latent variable $c_3$ of a third layer is converted using the value of the conversion result $c_2'$ for the latent variable $c_2$ of the second layer and a conversion result $c_3'$ is obtained. Then, the signal retrieval apparatus 100 retrieves accumulated image data having an attribute similar to the changed attribute by comparing the conversion result $c_3'$ obtained with respect to image data of a change target with the conversion result $c_3'$ obtained with respect to each piece of the accumulated image data.

Figure 9:
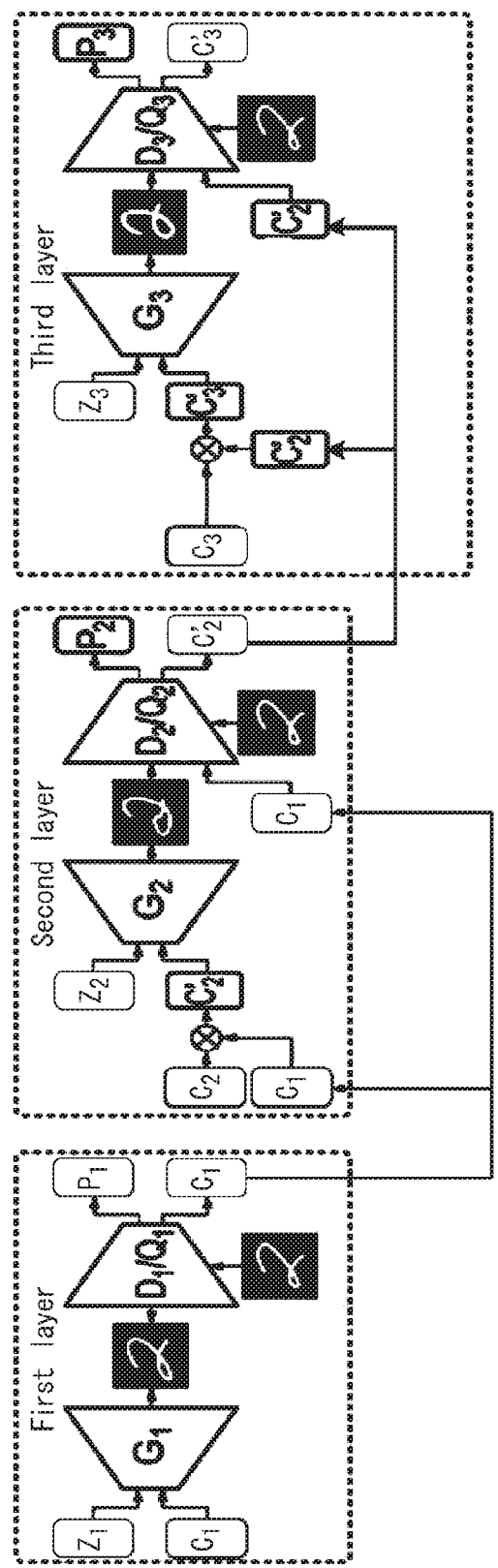
FIG. 9 is a conceptual diagram of generators, discriminators, and approximation distributions in the second embodiment of the present invention.

Moreover, in learning of the neural networks, as shown in FIG. 9, the signal retrieval apparatus 100 receives the latent variable $c_1$ and a latent variable $z_1$ representing identity of the first layer, and learns a neural network $G_1$ for generating image data, a neural network $D_1$ serving as a discriminator, and a neural network $Q_1$ serving as an approximation distribution. Moreover, the signal retrieval apparatus 100 receives the conversion result $c_2'$ for the latent variable of the second layer and a latent variable $z_2$ representing identity, and learns a neural network $G_2$ for generating image data, a neural network $D_2$ serving as a discriminator, and a neural network $Q_2$ serving as an approximation distribution. Furthermore, the signal retrieval apparatus 100 receives the conversion result $c_3'$ for the latent variable of the third layer and a latent variable $z_3$ representing identity, and learns the neural network $G_3$ for generating image data, a neural network $D_3$ serving as a discriminator, and a neural network $Q_3$ serving as an approximation distribution. It is to be noted that in FIG. 9, $P_1$, $P_2$, and $P_3$ are discrimination results by the neural networks $D_1$, $D_2$ and $D_3$ serving as the discriminators, respectively. Moreover, $c_1$, $c_2'$, and $c_3'$ respectively obtained in the first to third layers are latent variables representing attributes predicted by the neural networks $Q_1$, $Q_2$, and $Q_3$ serving as the approximation distributions.

In this manner, the signal retrieval apparatus 100 learns the neural network serving as the generator, the neural network serving as the discriminator, and the neural network serving as the approximation distribution on a layer-by-layer basis by initially learning the neural networks corresponding to the latent variable of the first layer and recursively learning the neural networks corresponding to a latent variable of a deeper layer by one layer on the basis of a learning result. Thereby, an abstract concept is first acquired in a shallow layer and the concept can be gradually detailed as the layer becomes deeper.

<Configuration of Signal Retrieval Apparatus According to Second Embodiment of Present Invention>

In the signal retrieval apparatus 100 according to the second embodiment of the present invention, an input unit 10 receives a plurality of pieces of image data x as learning data. Moreover, the input unit 10 receives a plurality of pieces of accumulated image data that are retrieval targets and image data x that is a change target for retrieval.

First, a learning unit 30 generates latent variables $z_1$, $z_2$, and $z_3$ representing identity and latent variables $c_1$, $c_2$, and $c_3$ representing each attribute in layers from given data distributions. Each latent variable represents, for example, the presence or absence or positive or negative of an attribute in each layer. However, latent variables are not particularly limited thereto. The learning unit 30 may generate the latent variables $z_1$, $z_2$, and $z_3$ and the latent variables $c_1$, $c_2$, and $c_3$ using random numbers. The learning unit 30 receives true image data x included in the input learning data, the generated latent variables $z_1$, $z_2$, and $z_3$ representing identity, and the generated latent variables $c_1$, $c_2$, and $c_3$ representing each attribute in the respective layers. Then, the learning unit 30 learns a neural network (e.g., a CNN) serving as a generator for generating image data and a neural network (e.g., a CNN) serving as a discriminator for discriminating whether or not the generated image data follows the same distribution as the true image data from the latent variables $z_1$, $z_2$, and $z_3$ representing identity and the latent variables $c_1$, $c_2$, and $c_3$ representing each attribute in accordance with optimization conditions that contend with each other. At the same time, the learning unit 30 performs learning so that a lower limit of an amount of information is maximized with respect to a neural network (e.g., a CNN) serving as an approximation distribution for estimating a latent variable representing each attribute with respect to the generated image data. The learning unit 30 iteratively performs the above-described process recursively with respect to each layer.

Specifically, the learning unit 30 first receives the true image data x included in the learning data input with respect to the first layer, the generated latent variable $z_1$ representing identity, and the latent variable $c_1$ representing each attribute of the first layer.

Then, the learning unit 30 generates image data using the generated latent variable $z_1$ representing identity, the latent variable $c_1$ representing each attribute of the first layer, and the neural network $G_1$ serving as a generator.

Then, the learning unit 30 updates a parameter of the neural network $G_1$ serving as the generator so as to satisfy a constraint that the discriminator discriminates that the generated image data follows the same distribution as the true image data x as much as possible. That is, the parameter of the neural network $G_1$ is updated so that the discriminator discriminates that the generated image data is the true image data x.

Moreover, the learning unit 30 updates a parameter of the neural network $D_1$ serving as the discriminator so as to satisfy a constraint that the discriminator discriminates that the generated image data does not follow the same distribution as the true image data x as much as possible and so as to satisfy a constraint that the discriminator discriminates that the true image data x follows the same distribution as the true image data.

Moreover the learning unit 30 updates a parameter of the neural network $Q_1$ serving as the approximation distribution so that a lower limit of a correlation (information amount) between the latent variable $c_1$ and image data generated from the latent variable $c_1$ is maximized with respect to the neural network $Q_1$ serving as the approximation distribution for predicting the latent variable $c_1$ representing each attribute of the first layer with respect to the generated image data.

Next, the learning unit 30 receives the true image data x included in the learning data input with respect to the second layer, the latent variable $c_1$ representing each attribute of the first layer predicted by the neural network $Q_1$ serving as the approximation distribution, the generated latent variable $z_2$ representing identity, and the latent variable $c_2$ representing each attribute of the second layer. At this time, the latent variable $c_2'$ representing each attribute of the second layer is obtained by converting the latent variable $c_2$ representing each attribute of the second layer using the value of the latent variable $c_1$ representing each attribute of the first layer. As an example of conversion, it is conceivable that the latent variable $c_2$ representing each attribute of the second layer is multiplied by the latent variable $c_1$ representing each attribute of the first layer.

Moreover, the learning unit 30 generates image data using the generated latent variable $z_2$ representing identity, the conversion result $c_2'$ for the latent variable $c_2$ representing each attribute of the second layer, and the neural network $G_2$ serving as the generator.

Then, the learning unit 30 updates a parameter of the neural network $G_2$ serving as the generator so as to satisfy a constraint that the discriminator discriminates that the generated image data follows the same distribution as the true image data under the latent variable $c_1$ representing each attribute of the first layer as much as possible. That is, the parameter of the neural network $G_2$ is updated so that the discriminator discriminates that the generated image data is the true image data.

Moreover, the learning unit 30 updates a parameter of the neural network $D_2$ serving as the discriminator so as to satisfy a constraint that the discriminator discriminates that the generated image data does not follow the same distribution as the true image data under the latent variable $c_1$ representing each attribute of the first layer as much as possible and so as to satisfy a constraint that the discriminator discriminates that the true image data x follows the same distribution as the true image data.

Moreover, the learning unit 30 updates a parameter of the neural network $Q_2$ serving as the approximation distribution so that a lower limit of a correlation (information amount) between the latent variable $c_2'$ and image data generated from the latent variable $c_2'$ is maximized with respect to the neural network $Q_2$ serving as the approximation distribution for predicting the latent variable $c_2'$ representing each attribute of the second layer with respect to the generated image data under the latent variable $c_1$ representing each attribute of the first layer.

Next, the learning unit 30 receives the true image data x included in the learning data input with respect to the third layer, the latent variable $c_2'$ representing each attribute of the second layer predicted by the neural network $Q_2$ serving as the approximation distribution, the generated latent variable $z_3$ representing identity, and the latent variable $c_3$ representing each attribute of the third layer. At this time, the latent variable $c_3'$ representing each attribute of the third layer is obtained by converting the latent variable $c_3$ representing each attribute of the third layer using the value of the conversion result $c_2'$ for the latent variable $c_2$ representing each attribute of the second layer.

Moreover, the learning unit 30 generates image data using the generated latent variable $z_3$ representing identity, the conversion result $c_3'$ for the latent variable $c_3$ representing each attribute of the third layer, and the neural network $G_3$ serving as the generator.

Then, the learning unit 30 updates a parameter of the neural network $G_3$ serving as the generator so as to satisfy a constraint that the discriminator discriminates that the generated image data follows the same distribution as the true image data under the conversion result $c_2'$ for the latent variable $c_2$ representing each attribute of the second layer as much as possible. That is, the parameter of the neural network $G_3$ is updated so that the discriminator discriminates that the generated image data is the true image data.

Moreover, the learning unit 30 updates a parameter of the neural network $D_3$ serving as the discriminator so as to satisfy a constraint that the discriminator discriminates that the generated image data does not follow the same distribution as the true image data under the conversion result $c_2'$ for the latent variable $c_2$ representing each attribute of the second layer as much as possible and so as to satisfy a constraint that the discriminator discriminates that the true image data x follows the same distribution as the true image data.

Moreover the learning unit 30 updates a parameter of the neural network $Q_3$ serving as the approximation distribution so that a lower limit of a correlation (information amount) between the latent variable $c_3'$ and image data generated from the latent variable $c_3'$ is maximized with respect to the neural network $Q_3$ serving as the approximation distribution for predicting the latent variable $c_3'$ representing each attribute of the third layer with respect to the generated image data under the conversion result $c_2'$ for the latent variable $c_2$ representing each attribute of the second layer.

The learning unit 30 performs the above-described process for each piece of the learning data and iteratively updates the parameters of various types of neural networks.

The neural networks $G_1$, $G_2$, and $G_3$ serving as the generators, the neural networks $D_1$, $D_2$, and $D_3$ serving as the discriminators, and the neural networks $Q_1$, $Q_2$, and $Q_3$ serving as the approximation distributions which are finally obtained are stored in the neural network storage unit 40.

Next, the learning unit 30 receives image data x included in the input learning data, estimates the latent variables $z_1$, $z_2$, and $z_3$ representing identity using a neural network serving as an encoder, and extracts the latent variables $c_1$, $c_2'$, and $c_3'$ representing each attribute using the neural networks $Q_1$, $Q_2$, and $Q_3$ serving as the approximation distributions.

Moreover, the learning unit 30 receives the estimated latent variable $z_3$ representing identity and the extracted latent variable $c_3'$ representing each attribute, and generates image data using the neural network $G_3$ serving as the generator.

Moreover, the learning unit 30 updates a parameter of the neural network serving as an encoder so as to satisfy a constraint that the generated image data is the same as the original image data x.

The learning unit 30 performs the above-described process for each piece of the learning data and iteratively updates the parameter of the neural network serving as the encoder.

The neural network serving as the encoder that is finally obtained is stored in the neural network storage unit 40.

The prediction unit 42 inputs the accumulated image data received by the input unit 10 to the neural network $Q_1$ serving as the approximation distribution for predicting the latent variable $c_1$ representing each attribute of the first layer and predicts the latent variable $c_1$ representing each attribute of the first layer.

The prediction unit 42 outputs the latent variable $c_1$ representing each attribute of the first layer.

The variable extraction unit 44 receives the accumulated image data, estimates latent variables $z_1$, $z_2$, and $z_3$ representing identity of the accumulated image data using the neural network serving as the encoder stored in the neural network storage unit 40, and extracts the latent variables $c_2'$ and $c_3'$ representing each attribute of the second and subsequent layers using the neural networks $Q_2$ and $Q_3$ serving as the approximation distributions.

The signal accumulation unit 46 stores each piece of the accumulated image data together with the latent variable $c_3'$ representing each attribute of the accumulated image data obtained by the variable extraction unit 44.

The prediction unit 50 inputs the image data of the change target received by the input unit 10 to the neural network $Q_1$ serving as the approximation distribution for predicting the latent variable $c_1$ representing each attribute of the first layer and predicts the latent variable $c_1$ representing each attribute of the first layer. The prediction unit 50 outputs the predicted latent variable $c_1$ to the variable extraction unit 52.

The variable extraction unit 52 receives the input image data x of the change target, estimates latent variables $z_1$, $z_2$, and $z_3$ representing identity of the image data x of the change target using the neural network serving as an encoder stored in the neural network storage unit 40, and extracts latent variables $c_2'$ and $c_3'$ representing the attribute of the second and subsequent layers using the neural networks $Q_2$ and $Q_3$ serving as the approximation distributions. The variable extraction unit 52 outputs the latent variable $c_1$ predicted by the prediction unit 50 and the extracted latent variables $c_2'$ and $c_3'$ to the signal attribute value display unit 54.

The signal attribute value display unit 54 causes the output unit 90 to display the latent variables $c_1$, $c_2'$, and $c_3'$ representing each attribute of the image data x of the change target in a state in which an instruction for changing the values can be received. Specifically, the signal attribute value display unit 54 displays the values of the latent variables $c_1$, $c_2'$, and $c_3'$ in the attribute change screen 92 by means of radio buttons 94 or slide bars 96 indicating the values of the latent variables $c_1$, $c_2'$, and $c_3'$ representing each attribute in a state in which an instruction for changing the values of the latent variables $c_1$, $c_2'$, and $c_3'$ representing each attribute can be received.

The changed attribute value acquisition unit 56 acquires changed values of the latent variables $c_1$, $c_2'$, and $c_3'$ representing the attribute of the change target when the instruction for changing the values of the latent variables $c_1$, $c_2'$, and $c_3'$ representing the attribute of the change target (e.g., an operation on the radio button 94 or the slide bar 96 indicating the value of the latent variable $c_3'$ representing each attribute) is received in the attribute change screen 92. It is to be noted that when an instruction for changing the value of the latent variable $c_1$ representing an attribute is received, the values of the associated latent variables $c_2'$ and $c_3'$ representing the attribute are also changed. Moreover, when an instruction for changing the value of the latent variable $c_2'$ representing the attribute is received, the value of the associated latent variable $c_3'$ representing the attribute is also changed.

The change unit 62 changes the latent variable $c_3'$ representing the attribute of the change target by replacing the latent variable $c_3'$ representing the attribute of the change target acquired by the changed attribute value acquisition unit 56 among the latent variables $c_1$, $c_2'$, and $c_3'$ representing each attribute obtained by the prediction unit 50 and the variable extraction unit 52 with the changed value.

The signal retrieval unit 64 retrieves accumulated image data corresponding to a latent variable most similar to the latent variable $c_3'$ representing each attribute after the change by the change unit 62 by comparing the latent variable $c_3'$ representing each attribute after the change by the change unit 62 with the latent variable $c_3'$ representing an attribute of each piece of accumulated image data stored in the signal accumulation unit 46. It is to be noted that it is only necessary to use a known distance measure such as a Euclidean distance as a distance measure when the comparison is performed.

It is to be noted that because the other configuration and operation of the signal retrieval apparatus 100 according to the second embodiment are similar to those of the first embodiment, a description thereof will be omitted.

As described above, the signal retrieval apparatus according to the second embodiment changes the value of the conversion result of the latent variable representing each attribute of the third layer in accordance with the change instruction and retrieves accumulated image data corresponding to a latent variable similar to the conversion result of the latent variable representing each attribute of the third layer after the change. Thereby, accumulated image data similar to the image data whose attribute has been changed can be retrieved.

It is to be noted that the present invention is not limited to the above-described embodiments and various modifications and applications can be made without departing from the gist of the present invention.

For example, in the above-described embodiments, the signal retrieval apparatuses 100 are configured so as to include the learning unit 30 for performing learning of the neural networks. However, the present invention is not limited to such a configuration. For example, a learning apparatus including the learning unit 30 may be provided separately from the signal retrieval apparatus and the signal retrieval apparatus may be configured to include a prediction unit, a variable extraction unit, a signal output unit, a signal attribute value display unit, a changed attribute value acquisition unit, a change unit, a signal retrieval unit, a similar signal output unit, and a signal accumulation unit.

Moreover, the above-described embodiments describe examples in which the input signal is face image data. However, the input signal is not limited thereto and may be image data other than the face image data. For example, the input signal may be character image data. In this case, an attribute vector y represents the presence or absence of each of types of characters (e.g., a, b, c, . . . 1, 2, . . . ), and a latent variable $z_a$ representing the attribute represents the diversity within a character (e.g., representing "What type of character is 4?"). Alternatively, the attribute vector y represents the presence or absence of each of character fonts (e.g., a Gothic style, a Mincho style, a bold style, an italic style, and the like), and the latent variable $z_a$ representing the attribute represents the diversity within a font (e.g., representing "What Gothic style is it?").

Moreover, the input signal may be animal image data (e.g., bird image data). In this case, the attribute vector y represents the presence or absence of a color (e.g., red), and the latent variable $z_a$ representing the attribute represents the diversity within the color (e.g., representing "How red is the bird in what part?"). Alternatively, the attribute vector y represents the shape of a part (e.g., a bill is round/pointed) and the latent variable $z_a$ representing the attribute represents the diversity within the part (e.g., representing "How round is the bill?").

Moreover, the input signal may be background image data. In this case, the attribute vector y represents the type of background (e.g., a sea, a mountain, a river, a house, or a road), and the latent variable $z_a$ representing the attribute represents the diversity within the background (e.g., representing "What type of sea is it?").

Moreover, the input signal may be house image data. In this case, the attribute vector y represents the presence or absence of a color (e.g., red), and the latent variable $z_a$ representing the attribute represents the diversity within the color (e.g., representing "How red is the house in what part?").

Moreover, the input signal may be structure image data. In this case, the attribute vector y represents the presence or absence of the type of structure (e.g., a building, a detached house, or a tower), and the latent variable $z_a$ representing the attribute represents the diversity within the structure (e.g., representing "What type of building is it?"). Alternatively, the attribute vector y represents the presence or absence of the shape of a part (e.g., a roof is flat, a roof is round, or a roof is triangular) and the latent variable $z_a$ representing the attribute represents the diversity within the part (e.g., representing "How flat is the roof?).

Moreover, the above-described embodiments describe examples in which the input signal is image data. However, the input signal is not limited thereto and may be a signal other than image data. For example, the input signal may be an audio signal (or a music signal), text data, or moving-image data.

Figure 10:
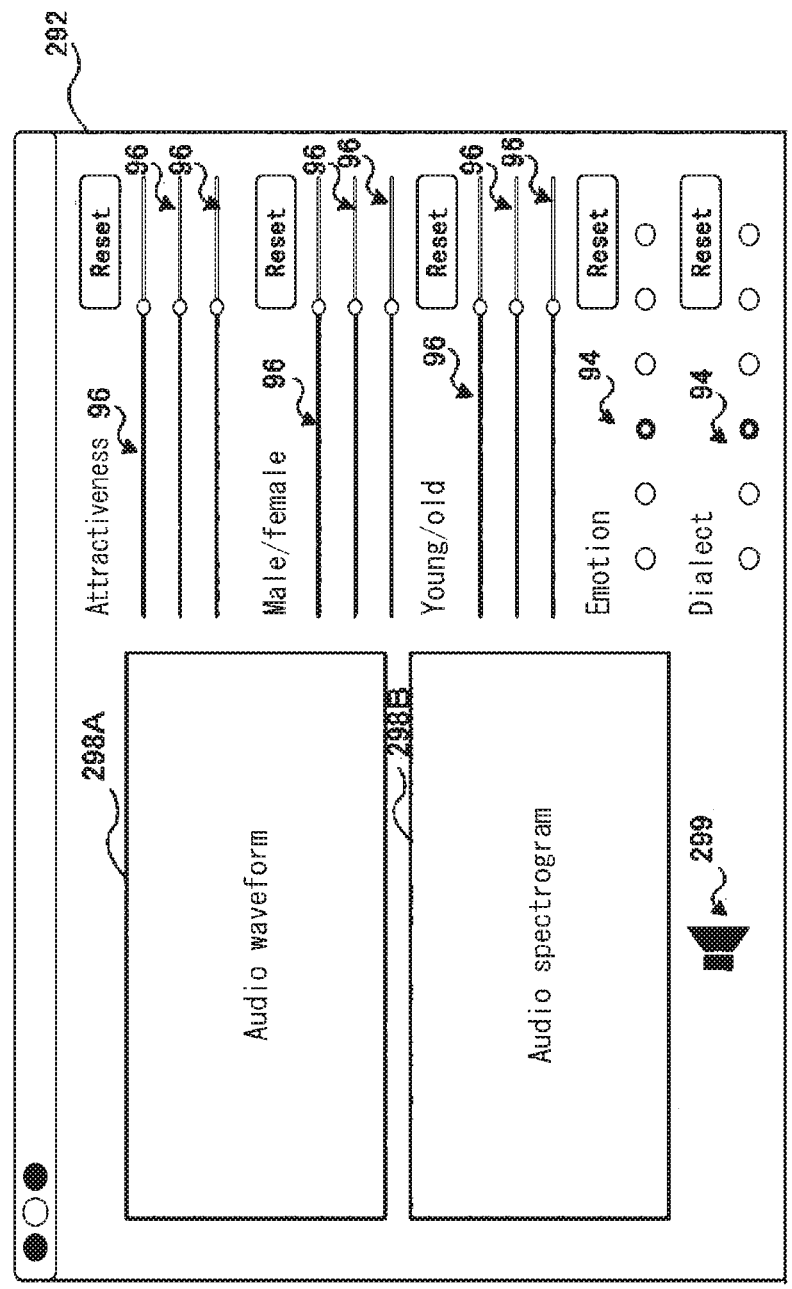
FIG. 10 is an imaginary diagram of an attribute change screen for changing an attribute of an audio signal.

When an audio signal is input, the signal retrieval apparatus 100 can reconfigure the audio signal by changing a latent variable representing an attribute after extracting a latent variable representing identity and a latent variable representing an attribute (an attribute related to a person who is a generation source of the audio signal (e.g., attractiveness, male/female, young/old, an emotion, a dialect, or the like) or an attribute related to an element constituting the audio signal (e.g., fast/slow or high/low)). In this case, as shown in FIG. 10, the signal output unit 53 or the similar signal output unit 66 causes an audio waveform and an audio spectrogram of audio data of the change target or an audio waveform and an audio spectrogram of audio data of a retrieval result to be displayed in audio display regions 298A and 298B of an attribute change screen 292. Moreover, the signal attribute value display unit 54 displays the value of a latent variable $z_a'$ representing each attribute in the attribute change screen 292 by means of a radio button 94 or a slide bar 96 indicating the value of the latent variable $z_a'$ representing each attribute in a state in which an instruction for changing the value of the latent variable $z_a'$ representing each attribute can be received. Moreover, a button 299 for issuing an instruction for reproducing an audio signal of the change target or an audio signal of a retrieval result is also displayed on the attribute change screen 292.

Figure 11:
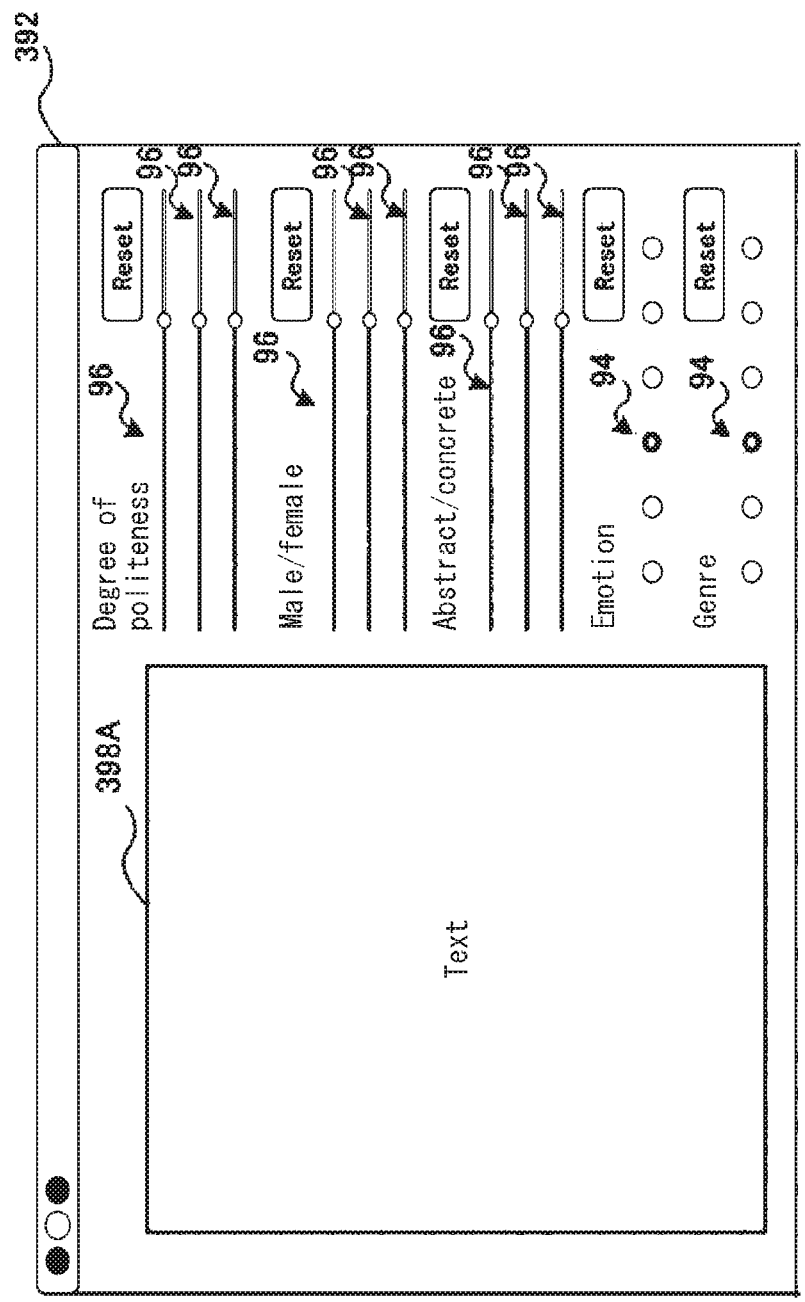
FIG. 11 is an imaginary diagram of an attribute change screen for changing an attribute of text data.

When text data is input, the signal retrieval apparatus 100 can reconfigure the text data by changing a latent variable representing an attribute after extracting a latent variable representing identity and a latent variable representing an attribute (an attribute related to a person who is a generation source of the text data (e.g., the degree of politeness, male/female, or the like) or an attribute related to an element constituting the text data (e.g., abstract/concrete, an emotion, a genre, colloquial/literary, or formal/not formal)). In this case, as shown in FIG. 11, the signal output unit 53 or the similar signal output unit 66 causes text data of the change target or text data of a retrieval result to be displayed in a text display region 398A of an attribute change screen 392. Moreover, the signal attribute value display unit 54 displays the value of a latent variable $z_a'$ representing each attribute in the attribute change screen 392 by means of a radio button 94 or a slide bar 96 indicating the value of the latent variable $z_a'$ representing each attribute in a state in which an instruction for changing the value of the latent variable $z_a'$ representing each attribute can be received.

Figure 12:
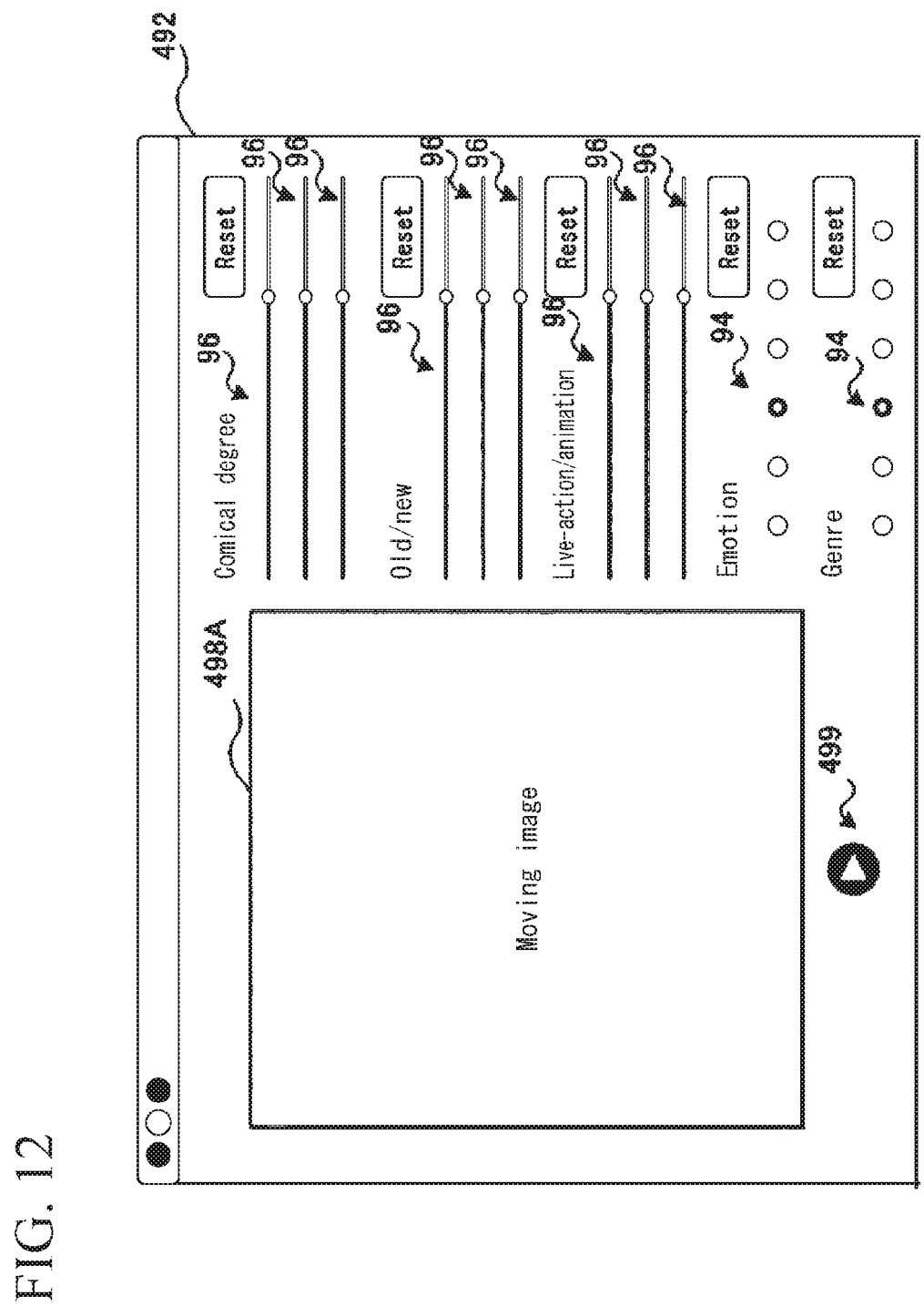
FIG. 12 is an imaginary diagram of an attribute change screen for changing an attribute of moving-image data.

When moving-image data is input, the signal retrieval apparatus 100 can reconfigure the moving-image data by changing a latent variable representing an attribute after extracting a latent variable representing identity and a latent variable representing an attribute (an attribute related to an element constituting the moving-image data (e.g., a comical degree, old/new, live-action/animation, an emotion, a genre, or the like)). In this case, as shown in FIG. 12, the signal output unit 53 or the similar signal output unit 66 causes moving-image data of the change target or moving-image data of a retrieval result to be displayed in a moving-image display region 498A of an attribute change screen 492. Moreover, the signal attribute value display unit 54 displays the value of a latent variable $z_a'$ representing each attribute in the attribute change screen 492 by means of a radio button 94 or a slide bar 96 indicating the value of the latent variable $z_a'$ representing each attribute in a state in which an instruction for changing the value of the latent variable $z_a'$ representing each attribute can be received. Moreover, a button 499 for issuing an instruction for reproducing the moving-image data of the change target or moving-image data of the retrieval result is also displayed in the attribute change screen 492.

It is to be noted that the first embodiment describes an example in which similar accumulated image data is retrieved by comparing the latent variables $z_a'$ representing respective attributes. However, a comparison target is not limited thereto. For example, latent variables $z_i$ representing identity may further be compared with each other to retrieve similar accumulated image data, attribute vectors y may further be compared with each other to retrieve similar accumulated image data, or image data may further be compared with each other to retrieve similar accumulated image data.

Moreover, the second embodiment describes an example in which the latent variables $c_3'$ representing respective attributes are compared with each other to retrieve similar accumulated image data. However, a comparison target is not limited thereto. For example, the latent variables $c_2'$ representing respective attributes may further be compared with each other to retrieve similar accumulated image data and the latent variables $c_1$ representing respective attributes may further be compared with each other to retrieve similar accumulated image data, so that the similar accumulated image data in each layer is retrieved. Furthermore, latent variables $z_i$ ($z_1$, $z_2$, and $z_3$) representing identity may be compared with each other to retrieve similar accumulated image data or image data may be compared with each other to retrieve similar accumulated image data.

Moreover, the above-described embodiments describe examples in which CNNs are used as the neural networks serving as the discriminators, the generators, the predictors, and the approximation distributions. However, the structure of the neural networks is not limited thereto and other neural network structures may be used. For example, a recurrent neural network (RNN) (e.g., a long short-term memory (LSTM) or the like) which is a model that takes time series into consideration, a fully-connected neural network, or the like may be used.

Moreover, the above-described embodiments describe examples in which the latent variables themselves are output as the output of the neural network serving as the encoder. However, the output of the neural network serving as the encoder is not limited thereto. For example, the output of the neural network serving as the encoder may be a parameter related to the distribution of latent variables (e.g., an average and a standard deviation in the case of a Gaussian distribution) and the latent variables may be obtained by performing sampling in accordance with the parameter related to the distribution.

Moreover, the second embodiment describes an example in which the neural network serving as the encoder estimates the latent variables $z_1$, $z_2$ and $z_3$ representing identity, predicts the latent variables $c_2'$ and $c_3'$ representing attributes using the neural networks $Q_2$ and $Q_3$ serving as the approximation distributions, and predicts the latent variable $c_1$ using the neural network serving as the predictor. However, the neural network serving as the encoder may simultaneously estimate the latent variables $c_1$, $c_2$, and $c_3$ representing attributes and the latent variables $z_1$, $z_2$, and $z_3$ representing identity. Alternatively, the neural network serving as the encoder may directly estimate the latent variables $c_2'$ and $c_3'$ representing the attribute instead of the latent variables $c_2$ and $c_3$ representing the attribute.

Moreover, the optimum latent variables $z_i$ ($z_1$, $z_2$, and $z_3$) representing identity may be obtained by inputting any latent variables $z_i$ ($z_1$, $z_2$, and $z_3$) representing identity to the neural network serving as the generator and updating the latent variables $z_i$ ($z_1$, $z_2$, and $z_3$) representing identity using a gradient method so that the output is close to a target image x, without using the neural network serving as the encoder. Moreover, the optimum latent variables $z_i$ ($z_1$, $z_2$, and $z_3$) representing identity may be obtained by obtaining the latent variable $c_1$ representing the attribute using the neural network serving as the predictor, obtaining the latent variables $c_2'$ and $c_3'$ representing the attribute and the latent variables $z_1$, $z_2$, and $z_3$ representing identity using the neural network serving as the encoder, setting the obtained latent variables as initial values, inputting the latent variables $z_i$ ($z_1$, $z_2$, and $z_3$) representing identity to the neural network serving as the generator, and updating the latent variables $z_i$ ($z_1$, $z_2$, and $z_3$) representing identity using a gradient method so that the output is close to a target image x.

Moreover, when the latent variables $c_2$ and $c_3$ representing the attribute are estimated simultaneously with the latent variables $z_i$ ($z_1$, $z_2$, and $z_3$) representing identity using the neural network serving as the encoder, the neural network serving as the encoder obtains the latent variables $c_2'$ and $c_3'$ representing the attribute on the basis of the estimated latent variables $c_2$ and $c_3$ representing each attribute and the predicted latent variable $c_1$ representing each attribute of the first layer. The latent variable $c_3'$ representing each attribute is obtained as follows.

First, the latent variable $c_2'$ representing each attribute of the second layer is obtained by converting the latent variable $c_2$ representing each attribute of the second layer using the value of the latent variable $c_1$ representing each attribute of the first layer. Next, the latent variable $c_3'$ representing each attribute of the third layer is obtained by converting the latent variable $c_3$ representing each attribute of the third layer using the value of the conversion result $c_2'$ of the latent variable $c_2$ representing each attribute of the second layer.

Moreover, the neural network serving as the encoder or the neural network serving as the predictor may be learned together with the neural network serving as the generator and the neural network serving as the discriminator.

Moreover, the second embodiment describes an example in which the latent variable $c_1$ representing each attribute of the first layer is predicted from the image data included in the learning data and is used for learning. However, a method for obtaining the latent variable $c_1$ representing each attribute of the first layer is not limited thereto. For example, when learning is performed, a latent variable $c_1$ representing each attribute of the first layer may be input as learning data.

Moreover, in addition to the latent variable $c_1$ representing each attribute of the first layer, the latent variable representing each attribute of any layer may also be input as learning data to learn a deeper layer.

Moreover, the first embodiment describes an example in which the attribute vector y is assigned to all the pieces of the image data x included in the learning data. However, the image data x to which the attribute vector y is assigned is not limited thereto. For example, the attribute vector y may be assigned only to part of image data x included in learning data. Alternatively, the learning data may not include the attribute vector y. In this case, the signal retrieval apparatus may estimate the attribute vector y as in the signal retrieval apparatus of the second embodiment that estimates the latent variable $c_1$ representing each attribute corresponding to the attribute vector y. The signal retrieval apparatus may learn each neural network on the basis of the estimated attribute vector y. Likewise, even in the case of the second embodiment, latent variables may be assigned only to part of image data x included in the learning data when latent variables representing each attribute of any layer are input as learning data.

A case in which the signal retrieval apparatus of the second embodiment obtains a latent variable $c_i'$ by converting a latent variable $c_i$ using the value of a latent variable $c_{i-1}'$ representing each attribute of a layer directly before a current layer has been described. However, the signal retrieval apparatus is not limited thereto and the latent variable $c_i'$ may be obtained by converting the latent variable $c_i$ using at least one of latent variables $c_j'$ (j=1, 2, ..., i−1) of a layer shallower than that corresponding to the latent variable $c_i'$. For example, when the latent variable $c_i'$ is obtained, the signal retrieval apparatus may obtain the latent variable $c_i'$ by converting the latent variable $c_i$ using a latent variable $c_{i-2}'$ of a layer that is two layers shallower than that corresponding to the latent variable $c_i'$. Furthermore, the signal retrieval apparatus may obtain the latent variable $c_i'$ on the basis of a predetermined relationship between the latent variable $c_j'$ (j=1, 2, ..., i−1) of a layer shallower than that corresponding to the latent variables $c_i'$ and the latent variables $c_i'$.

In the generator 2 in the signal retrieval apparatus of the first embodiment, a process of converting the latent variable $z_a$ using the attribute vector y may be performed by a neural network. The learning unit may perform learning of the neural network that converts the latent variable $z_a$ together with learning of the neural network G serving as the generator. In the generator 2 in the signal retrieval apparatus of the second embodiment, a process of obtaining the latent variable $c_i'$ by converting the latent variable $c_i$ using the latent variable may be performed by a neural network. The learning unit may perform learning of the neural network obtaining the latent variable $c_i'$ together with learning of the neural network $G_i$ serving as the generator.

A case in which the signal retrieval apparatus in the first embodiment generates the latent variables $z_i$ and $z_a$ from a given data distribution such as a categorical distribution or a uniform distribution has been described. However, a method for generating the latent variables $z_i$ and $z_a$ is not limited thereto. For example, the signal retrieval apparatus may generate the latent variables $z_i$ and $z_a$ on the basis of any distribution including a Gaussian distribution, a Dirichlet distribution, or the like. Likewise, the signal retrieval apparatus in the second embodiment may generate latent variables $z_1$, $z_2$, $z_3$, $c_1$, $c_2$, and $c_3$ on the basis of any distribution including a Gaussian distribution, a Dirichlet distribution, or the like. Alternatively, the signal retrieval apparatuses in the first and second embodiments may be provided with a neural network for generating each of the latent variables.

A case in which the signal retrieval apparatuses in the first and second embodiments use an objective function shown in Formula (5) as an optimization condition in learning of the neural network G serving as the generator and the neural network D serving as the discriminator has been described. However, the objective function representing the optimization condition in learning of the neural network G serving as the generator and the neural network D serving as the discriminator is not limited thereto. For example, the signal retrieval apparatus may use any extended model including a least squares GAN, a Wasserstein GAN, and the like.

A case in which the neural network D serving as the discriminator in the first and second embodiments discriminates whether or not image data generated by the generator follows the same distribution as true image data under an attribute vector has been described. However, a target to be discriminated by the neural network D serving as the discriminator is not limited thereto. For example, the neural network D serving as the discriminator may discriminate whether or not generated image data follows the same distribution as the true image data. In this case, the result of discriminating whether or not the image data includes an attribute vector may be added to the objective function in learning of the neural network G serving as the generator and the neural network D serving as the discriminator. When the image data includes the attribute vector, this means that an attribute (a feature) indicated by the attribute vector is included in the image data. The discrimination of whether or not image data includes an attribute vector may be executed by, for example, a neural network $Q_l$ (l=1, 2, ..., L) for estimating $P(c_1|x)$ and $P(c|x, p)$ approximation distributions.

When the result of discriminating whether or not the image data includes the attribute vector is added to the objective function serving as the optimization condition, for example, the objective function is represented by Formula (7). In learning using the objective function represented by Formula (7), learning of the neural network G serving as the generator, the neural network D serving as the discriminator, and the neural network $Q_l$ (l=1, 2, ..., L) for estimating the $P(c_1|x)$ and $P(c|x, p)$ approximation distributions is performed.

[Expression 11]

$$\min_{G} \max_{D} \min_{Q_1,\cdots,Q_L} \mathcal{L}_{GAN}(D, G) - \\ \lambda_1 \mathcal{L}_{MI/AC}(G, Q_1) - \sum_{l=2}^{L} \lambda_l \mathcal{L}_{HCMI}(G, Q_l) \quad (7)$$

In Formula (7), $\lambda_1, \ldots, \lambda_L$ are trade-off parameters. $L_{GAN}(D, G)$ is represented by Formula (8-1). $L_{MI/AC}(G, Q_1)$ represents that either $L_{MI}(G, Q_1)$ represented by Formula (8-2) or $L_{AC}(G, Q_1)$ represented by Formula (8-3) is used. When the learning data does not include an attribute vector, $L_{MI}(G, Q_1)$ is used. When the learning data includes an attribute vector, $L_{AC}(G, Q_1)$ is used. $L_{HCMI}(G, Q_1)$ is represented by Formula (8-4).

[Expression 12]

$$\mathcal{L}_{GAN}(D, G) = \mathbb{E}_{x \sim P_{data}(x)}[\log D(x)] + \mathbb{E}_{z \sim P_z(z)}[\log(1 - D(G(z)))] \quad (8\text{-}1)$$

$$\mathcal{L}_{MI}(G, Q_1) = \mathbb{E}_{c_1 \sim P(c_1), x \sim G(\hat{c}_L, z)}[\log Q_1(c_1|x)] \quad (8\text{-}2)$$

$$\mathcal{L}_{MI}(G, Q_1) = \\ \mathbb{E}_{c_1 \sim P(c_1), x \sim G(\hat{c}_L, z)}[\log Q_1(c_1|x)] + \mathbb{E}_{c_1, x \sim P_{data}(c_1, x)}[\log Q_1(c_1|x)] \quad (8\text{-}3)$$

$$\mathcal{L}_{HCMI}(G, Q_l) = \mathbb{E}_{c \sim P(c|p), x \sim G(\hat{c}_L, z)}[\log Q_l(c|x, p)] \quad (8\text{-}4)$$

In Formulas (8-1) to (8-4), $x \sim P_{data}(x)$ represents that true image data x is sampled from learning data. $z \sim P(z)$ represents that a latent variable z ($z_i$ and $z_a$) is generated from a given data distribution. $c_1 \sim P(c_1)$ represents that an attribute vector $c_1$ of a first layer is generated from a given data distribution. $x \sim G(\hat{c}_L, z)$ represents that image data is generated by the neural network G serving as the generator on the basis of a latent variable $\hat{c}_L$ representing each attribute in a layer L and a latent variable z ($z_i$ and $z_a$). $c_1, x \sim P_{data}(c_1, x)$ represents that true image data x and an attribute vector $c_1$ corresponding to the image data x are sampled from learning data. $c \sim P(c|p)$ represents that the latent variable c is sampled in accordance with a distribution $P(c|p)$. In Formula (8-4), c is a latent variable representing each attribute of an $l^{th}$ layer, and p is a latent variable representing each attribute of a $(l-1)^{th}$ layer.

Figure 13:
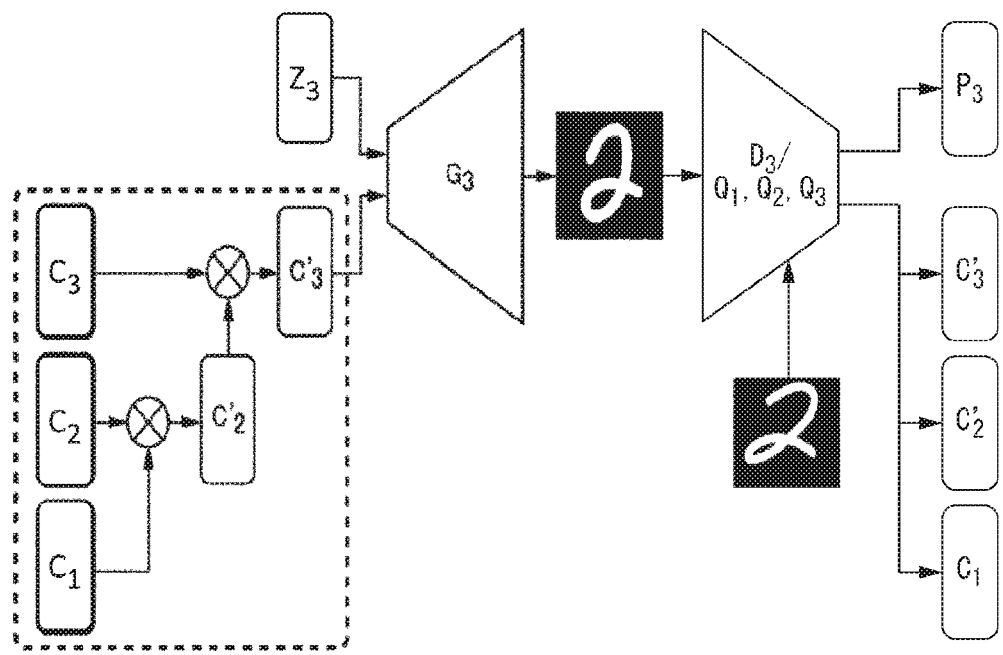
FIG. 13 is a conceptual diagram of a generator, a discriminator, and approximation distributions in the second embodiment of the present invention.

In the signal retrieval apparatus of the second embodiment, when the discriminator discriminates whether or not the generated image data follows the same distribution as the true image data, the learning unit 30 may include a configuration having a single-layer neural network shown in FIG. 13 instead of the configuration having a three-layer neural network shown in FIG. 9. When the learning unit 30 includes the configuration of the single-layer neural network shown in FIG. 13, the learning unit 30 includes a neural network $G_3$ operating as a generator, a neural network $D_3$ operating as a discriminator, and neural networks $Q_1$, $Q_2$, and $Q_3$ for estimating distributions of latent variables $c_1$, $c_2'$, and $c_3'$ representing each attribute.

In learning of each neural network, the learning unit 30 fixes the parameters of other neural networks other than one neural network that is a learning target and updates a parameter of the neural network of the learning target. The learning of each of the neural networks provided in the learning unit 30 is iterated for each piece of learning data as in the learning described in the first and second embodiments.

When the neural network $Q_1$ is learned, the learning unit 30 updates a parameter of the neural network $Q_1$ on the basis of the latent variables $c_2$ and $c_3$ in which predetermined initial values are set and the latent variables $z_3$ and $c_1$ generated from a given data distribution. When the neural network $Q_2$ is learned, the learning unit 30 updates a parameter of the neural network $Q_2$ on the basis of the latent variable $c_3$ in which the initial value is set and the latent variables $z_3$, $c_1$, and $c_2$ generated from a given data distribution. When the neural network $Q_3$ is learned, the learning unit 30 updates a parameter of the neural network $Q_3$ on the basis of the latent variables $z_3$, $c_1$, $c_2$, and $c_3$ generated from a given data distribution.

The initial values to be set in the latent variables $c_2$ and $c_3$ representing the attribute are determined on the basis of, for example, expected values or average values of values capable of being taken by the latent variables $c_2$ and $c_3$. Alternatively, the initial values may be determined on the basis of the number of variables included in the latent variables $c_2$ and $c_3$. The learning of the neural networks $G_3$ and $D_3$ is similar to the learning described in the second embodiment.

The discrimination of whether or not image data includes an attribute vector may be performed by the neural network D serving as the discriminator. When the discriminator discriminates whether or not image data includes an attribute vector, the discriminator may further include a neural network that determines whether or not each attribute is included in the input image data.

The signal retrieval apparatuses may apply known image processing technology to the generated image data. For example, the signal retrieval apparatuses may perform super-resolution processing or correction of the image quality on the generated image.

The signal retrieval apparatuses and the learning apparatuses in the above-described embodiments may be implemented by a computer. In this case, the signal retrieval apparatuses and the learning apparatuses may be implemented by recording a program for implementing their functions on a computer-readable recording medium and causing a computer system to read and execute the program recorded on the recording medium. It is to be noted that the "computer system" described here is assumed to include an operating system (OS) and hardware such as peripheral devices. Moreover, the "computer-readable recording medium" refers to a portable medium such as a flexible disk, a magneto-optical disc, a read only memory (ROM), and a compact disc (CD)-ROM, and a storage apparatus such as a hard disk embedded in the computer system. Furthermore, the "computer-readable recording medium" may also include a computer-readable recording medium for dynamically holding a program for a short time as in a communication line when the program is transmitted via a network such as the Internet or a communication circuit such as a telephone circuit and a computer-readable recording medium for holding the program for a fixed time as in a volatile memory inside the computer system serving as a server or a client. Moreover, the program may be used to implement some of the above-described functions. The program may implement the above-described functions in combination with a program already recorded on the computer system. The program may be implemented using a programmable logic device such as a field programmable gate array (FPGA).

INDUSTRIAL APPLICABILITY

The present invention can be used to, for example, retrieve a signal such as an image. According to the present invention, it is possible to retrieve a signal similar to a signal whose attribute has been changed.

DESCRIPTION OF REFERENCE SIGNS

1 Encoder
2 Generator
3 Discriminator
10 Input unit
20 Arithmetic unit
30 Learning unit
40 Neural network storage unit
42 Prediction unit
44 Variable extraction unit
46 Signal accumulation unit
50 Prediction unit
52 Variable extraction unit
53 Signal output unit
54 Signal attribute value display unit
56 Changed attribute value acquisition unit
62 Change unit
64 Signal retrieval unit
66 Similar signal output unit
90 Output unit
92 Attribute change screen
94 Radio button
96 Slide bar
98A Image display region
100 Signal retrieval apparatus
292 Attribute change screen
294 Radio button
298A, 298B Audio display region
299 Button
392 Attribute change screen
398A Text display region
492 Attribute change screen
498A Moving-image display region
499 Button
E, D, G, $Q_1$, $Q_2$, $Q_3$ Neural network

The invention claimed is:

1. A signal retrieval apparatus comprising:
a signal outputter that outputs an acquired signal;
a signal accumulator that accumulates signals;
a signal attribute value displayer that displays a value of an attribute related to an element constituting a target represented by the acquired signal or a signal generation source in a state in which an instruction for changing the value of the attribute is able to be received;
a changed attribute value acquirer that acquires a changed value of the attribute when the instruction for changing the value of the attribute is received; and
a signal retriever that retrieves, from the signals accumulated in the signal accumulator, a signal similar to a changed signal when the value of the attribute has been changed on the basis of the changed value of the attribute acquired by the changed attribute value acquirer,
wherein the signal attribute value displayer outputs, among a plurality of latent variables that are extracted from the acquired signal and includes a first latent variable representing identity of the acquired signal and at least one second latent variable that is independent of the first latent variable and that is a latent variable representing an attribute of the acquired signal or a latent variable obtained by converting the latent variable representing the attribute of the acquired signal using an attribute vector, the at least one second latent variable,
the changed attribute value acquirer acquires at least one third latent variable representing a changed attribute by converting the at least one second latent variable,
the signal retriever retrieves a signal that is similar to a signal obtained by changing the acquired signal on the basis of the at least one third latent variable from the signals accumulated in the signal accumulator, and
each of the signal outputter, the signal accumulator, the signal attribute value displayer, the changed attribute value acquirer, and the signal retriever is implemented by: i) computer executable instructions executed by at least one processor, ii) at least one circuit, or iii) a combination of the computer executable instructions and the at least one circuit.

2. The signal retrieval apparatus according to claim 1, wherein each of the acquired signal, the signals accumulated in the signal accumulator, the changed signal, and the signal similar to the changed signal is an image, and
the attribute is an attribute related to an element constituting a subject represented by the image.

3. The signal retrieval apparatus according to claim 1 or 2, wherein the signal attribute value displayer displays the value of the attribute by means of a controller indicating the value of the attribute as the state in which the instruction for changing the value of the attribute is able to be received.

4. A signal retrieval apparatus comprising:
a signal outputter that outputs an acquired signal;
a signal accumulator that accumulates signals;
a variable extractor that extracts, from the acquired signal, a value of an attribute related to an element constituting a target represented by the acquired signal or a signal generation source;
a signal attribute value displayer that displays the value of the attribute in a state in which an instruction for changing the value of the attribute of the acquired signal is able to be received;
a changed attribute value acquirer that acquires a changed value of the attribute when the instruction for changing the value of the attribute is received; and
a signal retriever that retrieves, from the signals accumulated in the signal accumulator, a signal similar to a changed signal when the value of the attribute has been changed on the basis of the changed value of the attribute, on the basis of the changed value of the attribute and a value of an attribute extracted with respect to each of the signals accumulated in the signal accumulator,
wherein the variable extractor extracts, from the acquired signal, a plurality of latent variables that includes a first latent variable representing identity of the acquired signal and at least one second latent variable that is independent of the first latent variable and that is a latent variable representing an attribute of the acquired signal or a latent variable obtained by converting the latent variable representing the attribute of the acquired signal using an attribute vector,
the signal attribute value displayer outputs the at least one second latent variable,
the changed attribute value acquirer acquires at least one third latent variable representing a changed attribute by converting the at least one second latent variable,
the signal retriever retrieves a signal that is similar to a signal obtained by changing the acquired signal on the basis of the at least one third latent variable from the signals accumulated in the signal accumulator, and
each of the signal outputter, the signal accumulator, the variable extractor, the signal attribute value displayer, the changed attribute value acquirer, and the signal retriever is implemented by: i) computer executable instructions executed by at least one processor, ii) at least one circuit, or iii) a combination of the computer executable instructions and the at least one circuit.

5. The signal retrieval apparatus according to claim 4, wherein the signal retriever retrieves the signal similar to the changed signal from the signals accumulated in the signal accumulator by comparing the changed value of the attribute with the value of the attribute extracted with respect to each of the signals accumulated in the signal accumulator.

6. The signal retrieval apparatus according to claim 4 or 5, wherein the variable extractor extracts the plurality of latent variables from the acquired signal using a pre-learned neural network,
the changed attribute value acquirer acquires the at least one third latent variable when the instruction for changing the value of the attribute is received, and
the signal retriever retrieves, from the signals accumulated in the signal accumulator, a signal similar to a changed signal when the value of the attribute has been changed on the basis of the at least one third latent variable by comparing the at least one third latent variable with a latent variable representing the attribute extracted with respect to each of the signals accumulated in the signal accumulator.

7. A non-transitory computer-readable medium storing a program for causing a computer to function as the signal retrieval apparatus according to claim 1.

8. A signal retrieval method comprising:
outputting, by a signal outputter, an acquired signal;
displaying, by a signal attribute value displayer, a value of an attribute related to an element constituting a target represented by the acquired signal or a signal generation source in a state in which an instruction for changing the value of the attribute is able to be received;

acquiring, by a changed attribute value acquirer, a changed value of the attribute when the instruction for changing the value of the attribute is received;

retrieving, by a signal retriever, from a signal accumulator that accumulates signals, a signal similar to a changed signal when the value of the attribute has been changed on the basis of the changed value of the attribute acquired by the changed attribute value acquirer;

outputting, by the signal attribute value displayer, among a plurality of latent variables that are extracted from the acquired signal and includes a first latent variable representing identity of the acquired signal and at least one second latent variable that is independent of the first latent variable and that is a latent variable representing an attribute of the acquired signal or a latent variable obtained by converting the latent variable representing the attribute of the acquired signal using an attribute vector, the at least one second latent variable;

acquiring, by the changed attribute value acquirer, at least one third latent variable representing a changed attribute by converting the at least one second latent variable; and retrieving, by the signal retriever, a signal that is similar to a signal obtained by changing the acquired signal on the basis of the at least one third latent variable from the signals accumulated in the signal accumulator, wherein each of the signal outputter, the signal attribute value displayer, the changed attribute value acquirer, the signal retriever, and the signal accumulator is implemented by: i) computer executable instructions executed by at least one processor, ii) at least one circuit, or iii) a combination of the computer executable instructions and the at least one circuit.

9. A signal retrieval method comprising:

outputting, by a signal outputter, an acquired signal;

extracting, by a variable extractor, from the acquired signal, a value of an attribute related to an element constituting a target represented by the acquired signal or a signal generation source;

displaying, by a signal attribute value displayer, the value of the attribute in a state in which an instruction for changing the value of the attribute of the acquired signal is able to be received;

acquiring, by a changed attribute value acquirer, a changed value of the attribute when the instruction for changing the value of the attribute is received; and retrieving, by a signal retriever, from signals accumulated in a signal accumulator, a signal similar to a changed signal when the value of the attribute has been changed on the basis of the changed value of the attribute, on the basis of the changed value of the attribute and a value of an attribute extracted with respect to each of the signals accumulated in the signal accumulator;

extracting, by the variable extractor, from the acquired signal, a plurality of latent variables that includes a first latent variable representing identity of the acquired signal and at least one second latent variable that is independent of the first latent variable and that is a latent variable representing an attribute of the acquired signal or a latent variable obtained by converting the latent variable representing the attribute of the acquired signal using an attribute vector;

outputting, by the signal attribute value displayer, the at least one second latent variable;

acquiring, by the changed attribute value acquirer, at least one third latent variable representing a changed attribute by converting the at least one second latent variable; and retrieving, by the signal retriever, a signal that is similar to a signal obtained by changing the acquired signal on the basis of the at least one third latent variable from the signals accumulated in the signal accumulator, wherein each of the signal outputter, the variable extractor, the signal attribute value displayer, the changed attribute value acquirer, the signal retriever, and the signal accumulator is implemented by: i) computer executable instructions executed by at least one processor, ii) at least one circuit, or iii) a combination of the computer executable instructions and the at least one circuit.

10. The signal retrieval apparatus according to claim 4, wherein the variable extractor extracts second latent variables as the at least one second latent variable, the signal retrieval apparatus further comprises a changer that changes a value of a second latent variable representing an attribute of a change target by replacing the value of the second latent variable representing the attribute of the change target among the second latent variables representing each the attribute extracted by the variable extractor with the changed value acquired by the changed attribute value acquirer, the variable extractor extracts a plurality of first latent variables and a plurality of second latent variables from the accumulated signals by extracting, from each of the accumulated signals, a plurality of latent variables that includes a first latent variable representing identity of each of the accumulated signals and at least one second latent variable that is independent of the first latent variable and that is a latent variable representing an attribute of each of the accumulated signals or a latent variable obtained by converting the latent variable representing the attribute of each of the accumulated signals using the attribute vector, the signal accumulator stores the plurality of second latent variables extracted with respect to the accumulated signals in addition to the accumulated signals, the signal retriever retrieves the signal corresponding to a latent variable that is most similar to the at least one third latent variable among the second latent variables accumulated in the signal accumulator by comparing the at least one third latent variable with the second latent variables extracted with respect to the accumulated signals, and the changer is implemented by: i) computer executable instructions executed by at least one processor, ii) at least one circuit, or iii) a combination of the computer executable instructions and the at least one circuit.

11. A non-transitory computer-readable medium storing a program for causing a computer to function as the signal retrieval apparatus according to claim 4.

* * * * *